United States Patent
Tobe et al.

[11] Patent Number: 6,101,184
[45] Date of Patent: Aug. 8, 2000

[54] DATA SWITCHING METHOD AND DATA SWITCHING APPARATUS FOR EFFICIENTLY HANDLING SCAN DATA IN INFORMATION COMMUNICATION NETWORK

[75] Inventors: Yoshito Tobe, Tokorozawa; Yasuhisa Shiobara, Tokyo, both of Japan

[73] Assignee: Kabushiki Kaisha Toshiba, Kawasaki, Japan

[21] Appl. No.: 08/712,667

[22] Filed: Sep. 13, 1996

[30] Foreign Application Priority Data

Sep. 14, 1995 [JP] Japan .................................. 7-237471

[51] Int. Cl.$^7$ .................................................. H04L 12/56
[52] U.S. Cl. .............................................................. 370/390
[58] Field of Search ..................................... 370/390, 395, 370/396, 389, 444, 351, 465, 346, 397, 409, 441, 232, 233, 235, 318, 319; 340/825.5, 825.51, 825.52; 358/505, 560, 539, 540, 400, 408, 425, 426, 474

[56] References Cited

U.S. PATENT DOCUMENTS

| | | | |
|---|---|---|---|
| 4,930,121 | 5/1990 | Shiobara | 340/825.5 |
| 5,042,030 | 8/1991 | Grima et al. | 370/358 |
| 5,086,434 | 2/1992 | Abe et al. | 358/450 |
| 5,519,704 | 5/1996 | Farinacci et al. | 370/410 |
| 5,521,923 | 5/1996 | Willmann et al. | 370/412 |
| 5,544,161 | 8/1996 | Bigham et al. | 370/397 |
| 5,613,191 | 3/1997 | Hylton et al. | 370/342 |
| 5,748,780 | 5/1998 | Stolfo | 382/232 |

*Primary Examiner*—Dang Ton
*Attorney, Agent, or Firm*—Oblon, Spivak, McClelland, Maier & Neustadt, P.C.

[57] ABSTRACT

In a data switching method for switching data among data switching apparatuses arranged on an ATM network and interconnected by links along a cell data transmission path, data input to a specified one of the data switching apparatuses from an upstream-side one of the data switching apparatuses along the transmission path is sent out to a downstream-side one of the data switching apparatuses along the transmission path. A branch-system data switching operation for delivering data, which has been input to the specified data switching apparatus from at least one terminal linked to the specified data switching apparatus, to a specified one of the terminals and the data switching apparatuses, is performed separately from a trunk-system data switching operation for delivering data, which has been input to the specified data switching apparatus from the upstream-side data switching apparatus, to the downstream-side data switching apparatus and terminals.

24 Claims, 16 Drawing Sheets

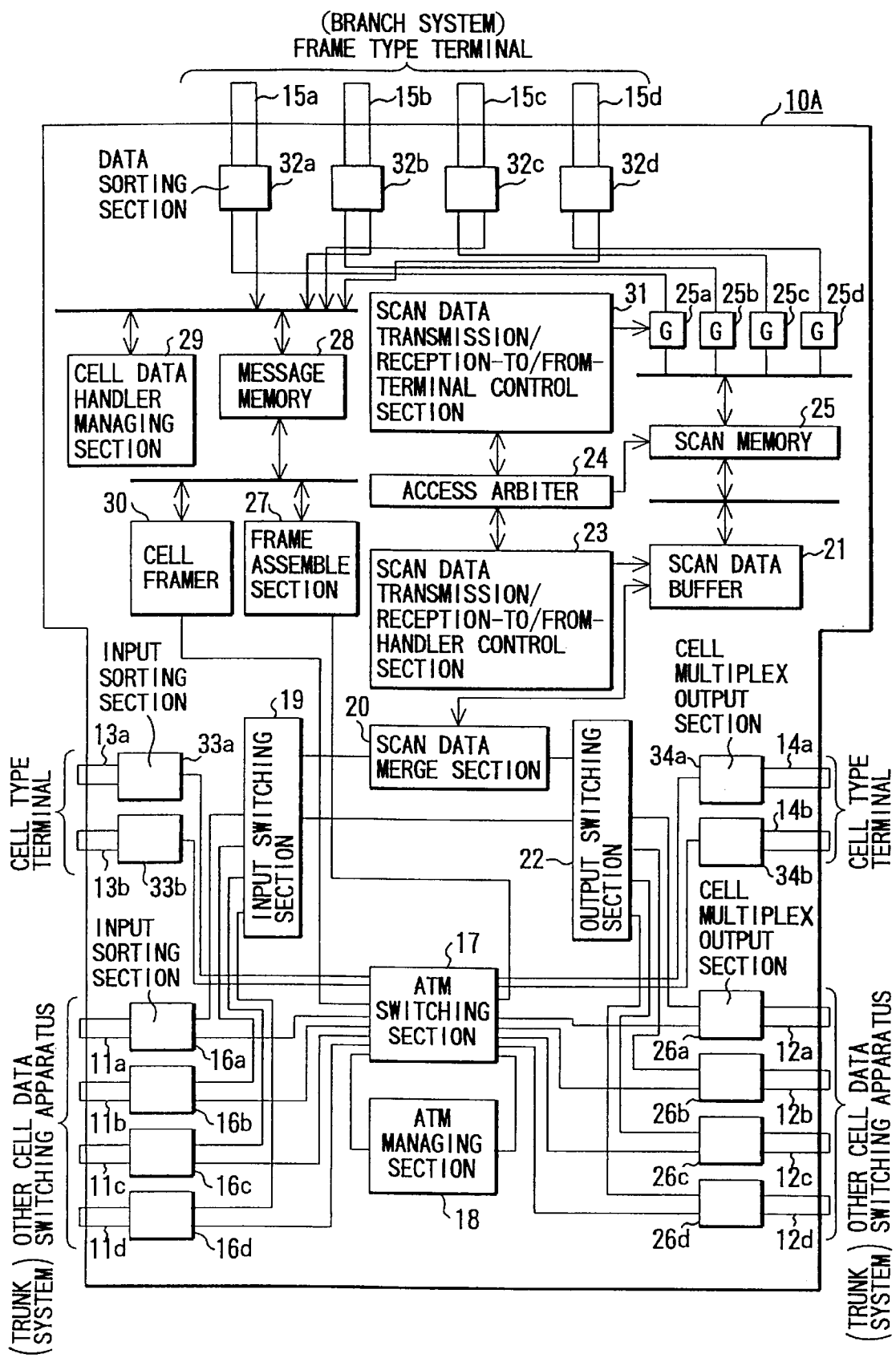
F I G. 1

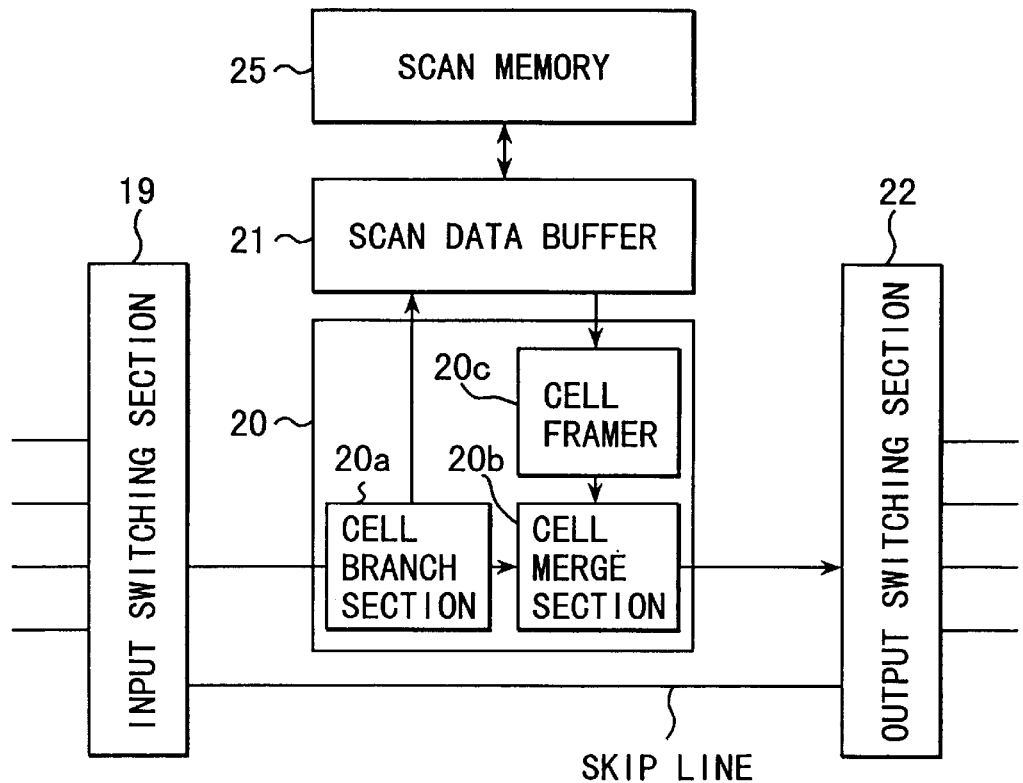
F I G. 2
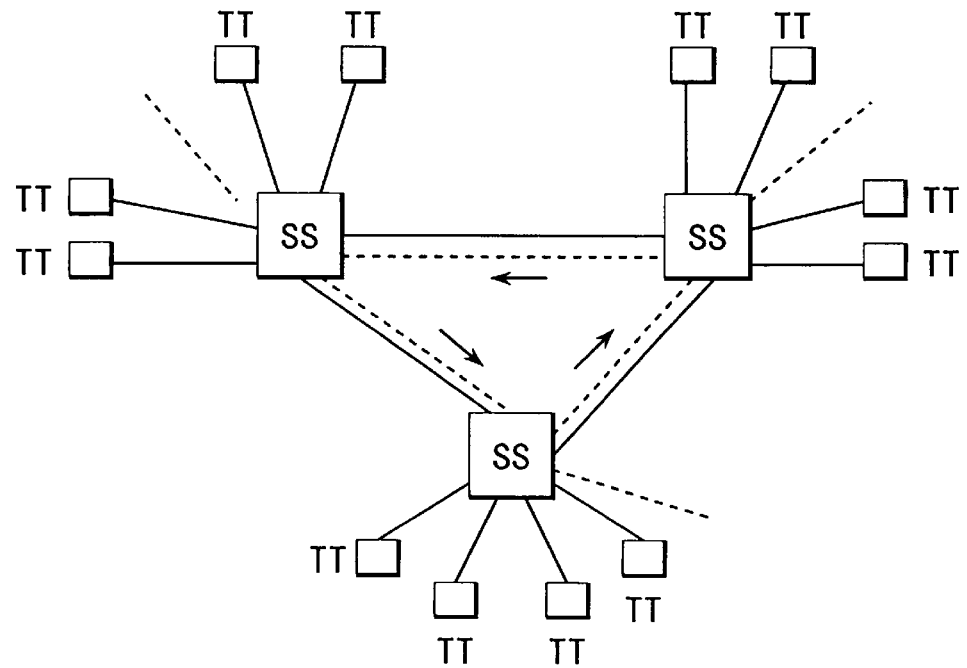
F I G. 3

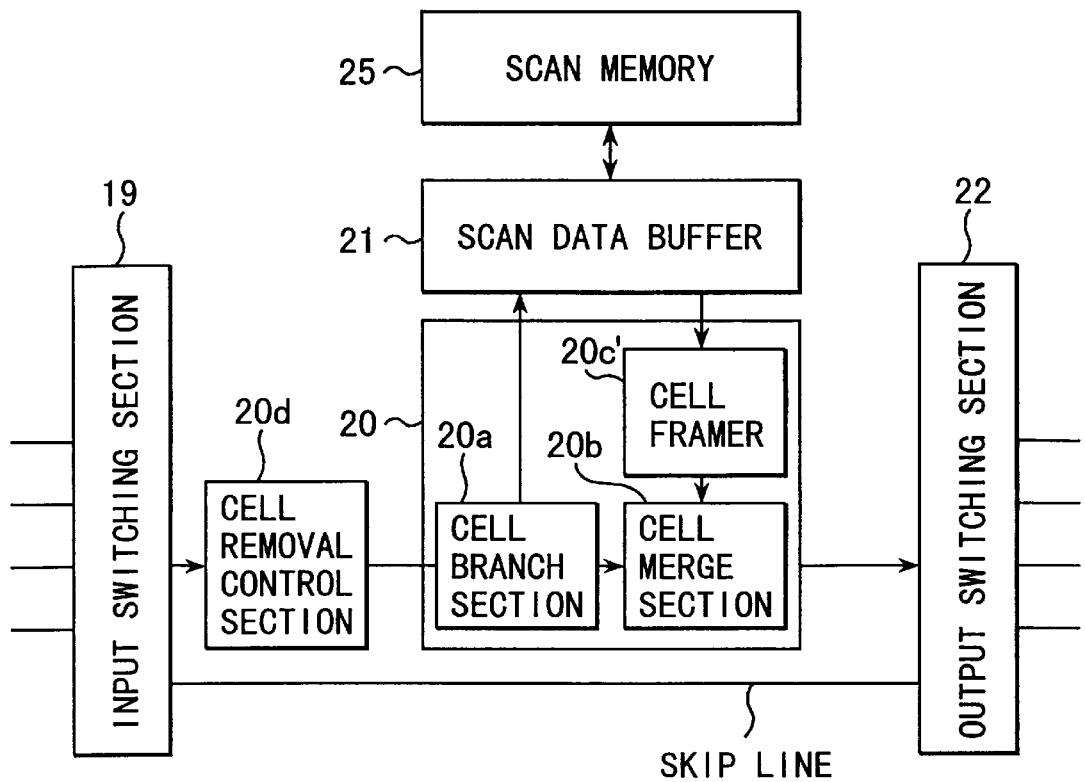
F I G. 4
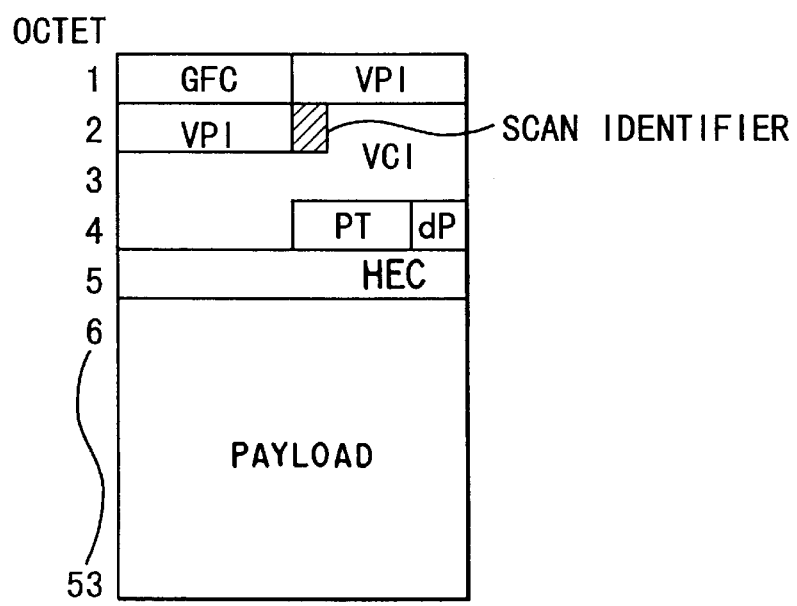
F I G. 5

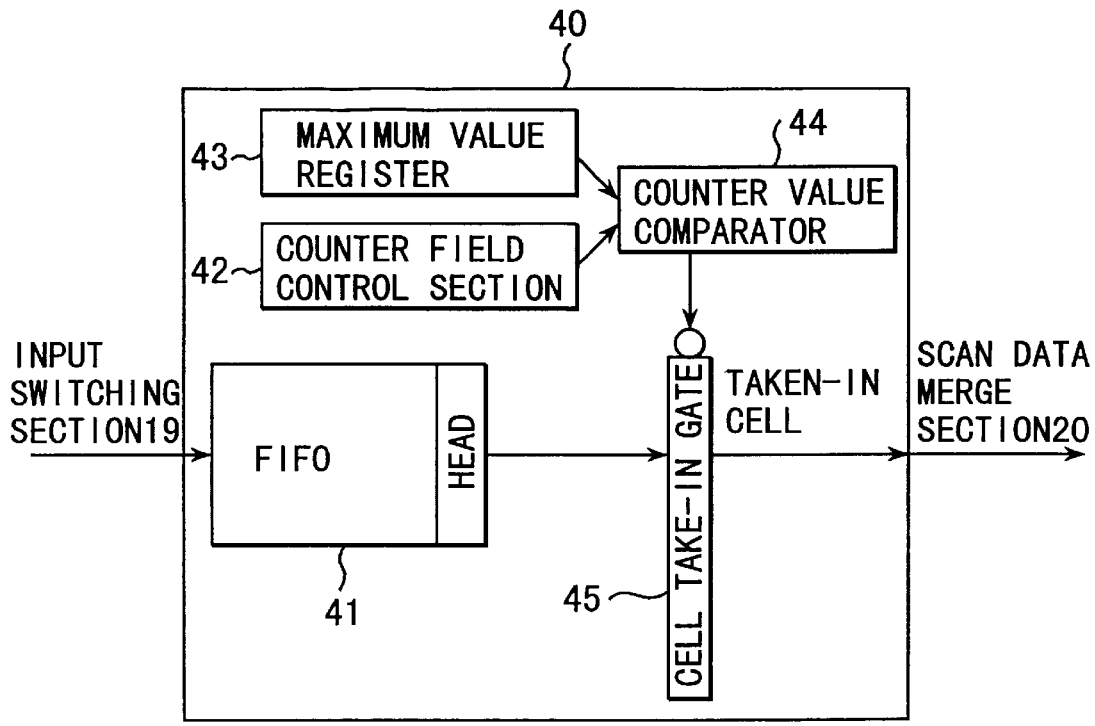
F I G. 7
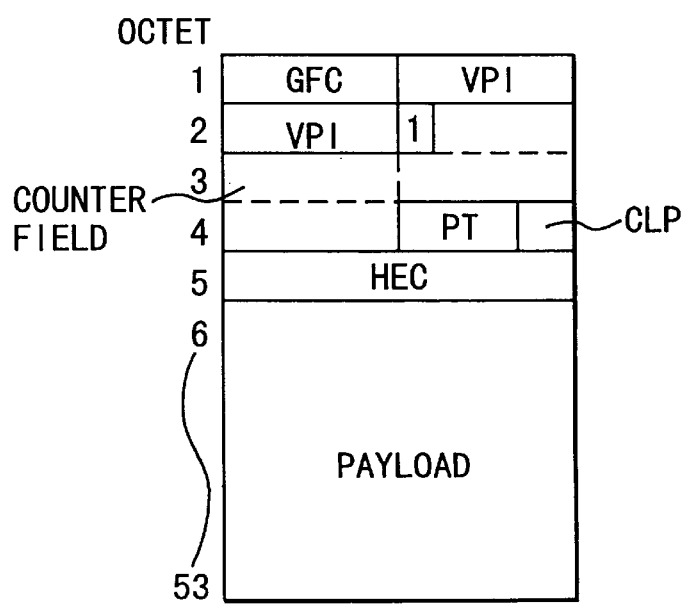
F I G. 8

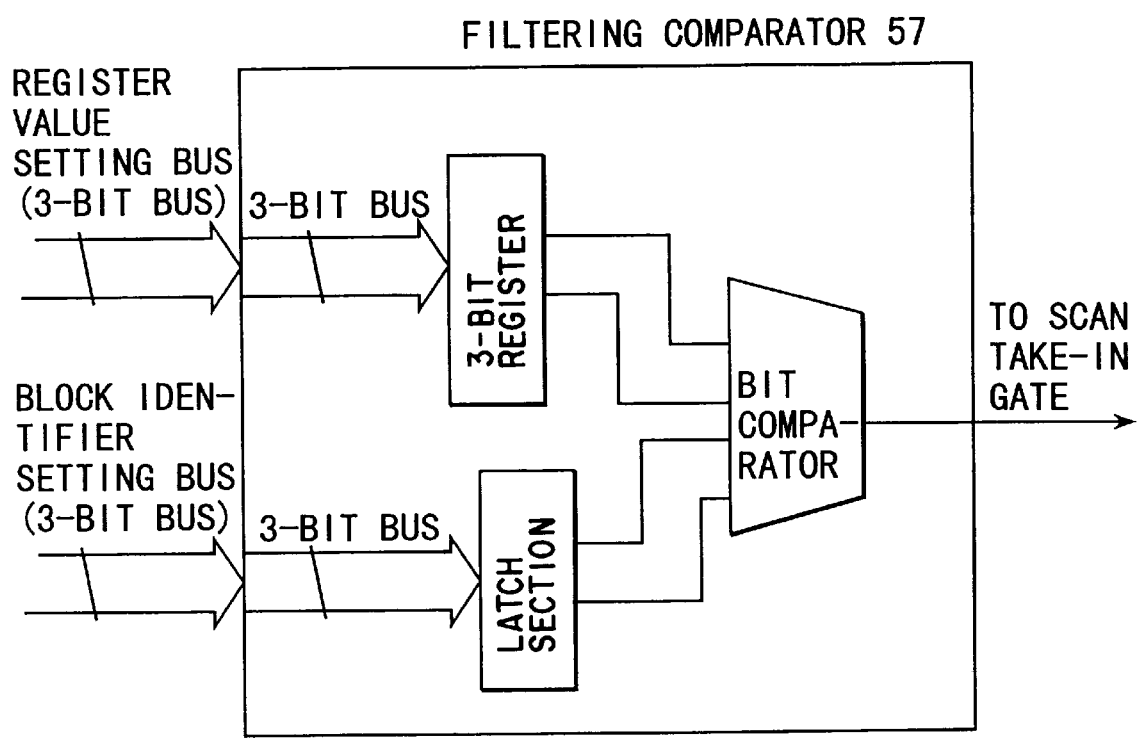
F I G. 11

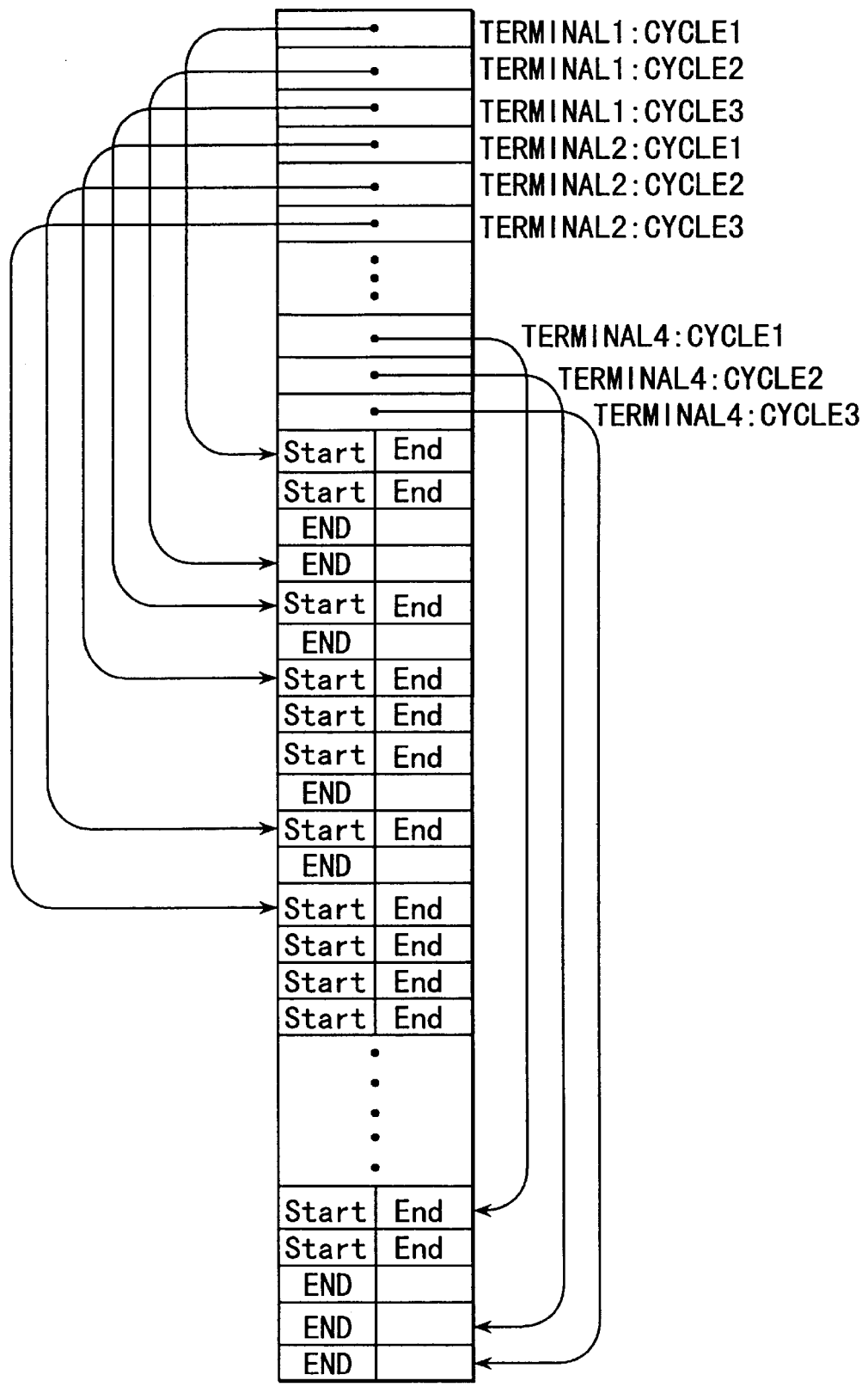
F I G. 13

SCAN MEMORY

| 0 | 1 | 2 | 3 | 4 | 5 | 6 |
|---|---|---|---|---|---|---|

| AA | 0~2 | 10mS |
|----|-----|------|
|    | 3~5 | 100mS |
| BB | 0   | 10mS |
|    | 3~6 | 100mS |

| 10mS  | 0~0 | AA, BB |
|-------|-----|--------|
|       | 1~2 | AA     |
| 100mS | 3~5 | AA, BB |
|       | 6   | BB     |

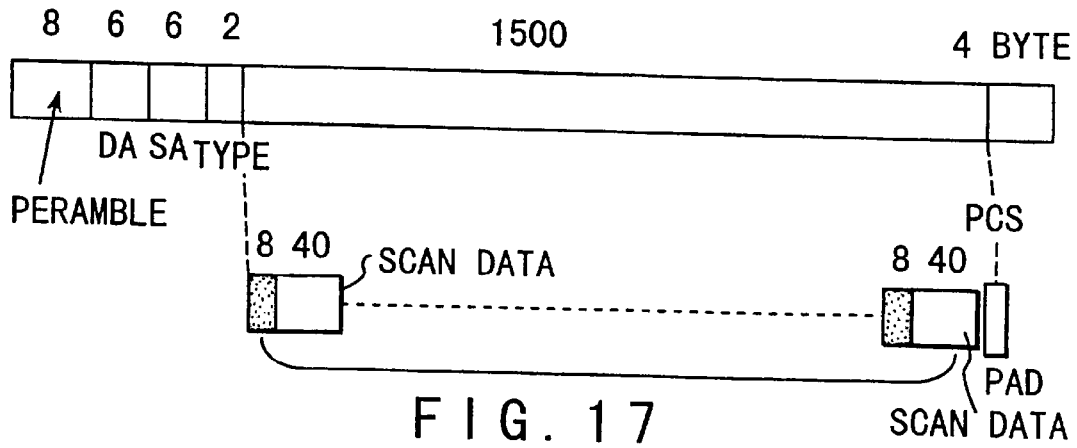
F I G. 17
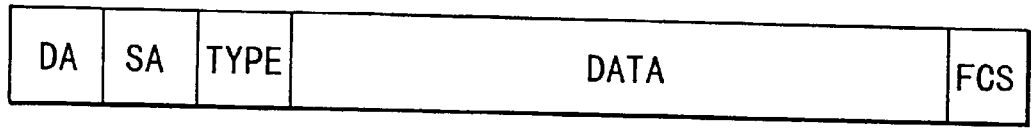
F I G. 18
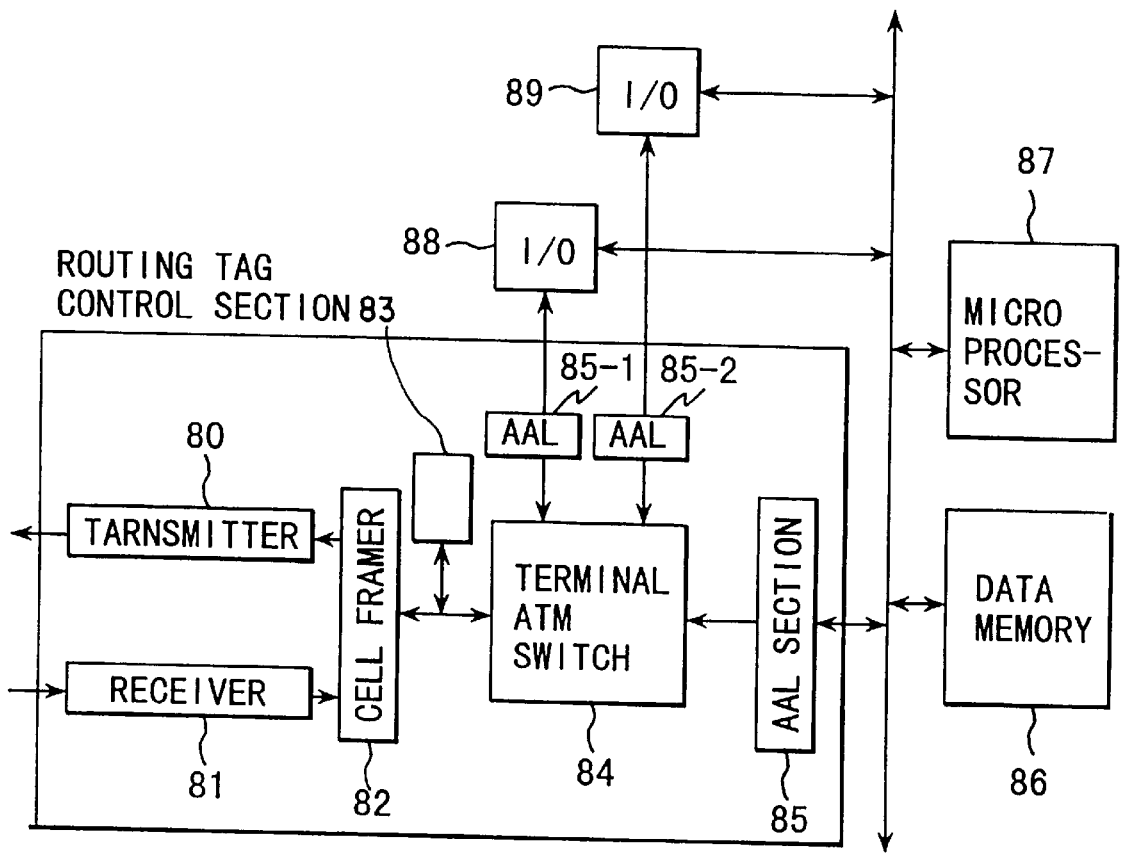
F I G. 20

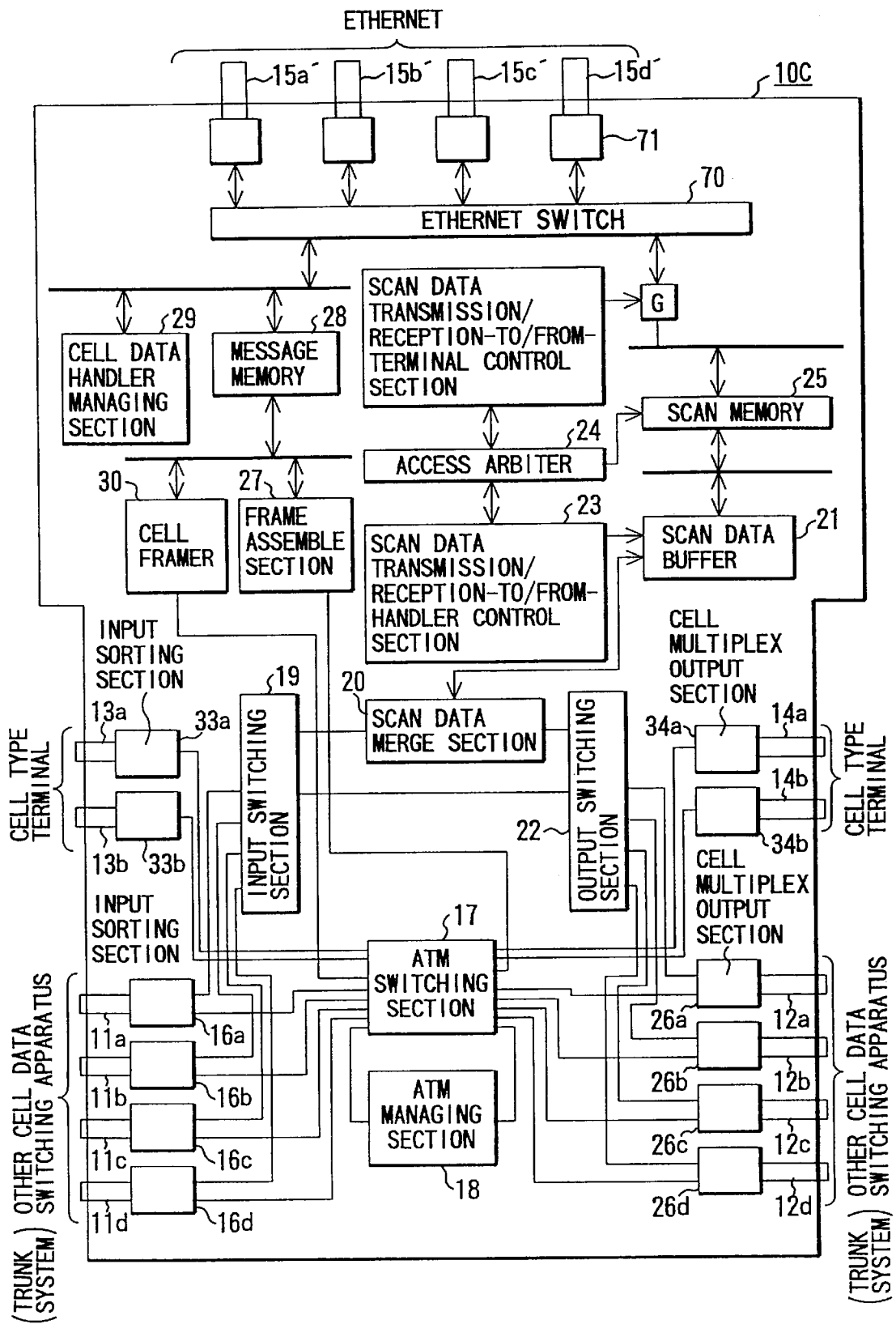
F I G. 19

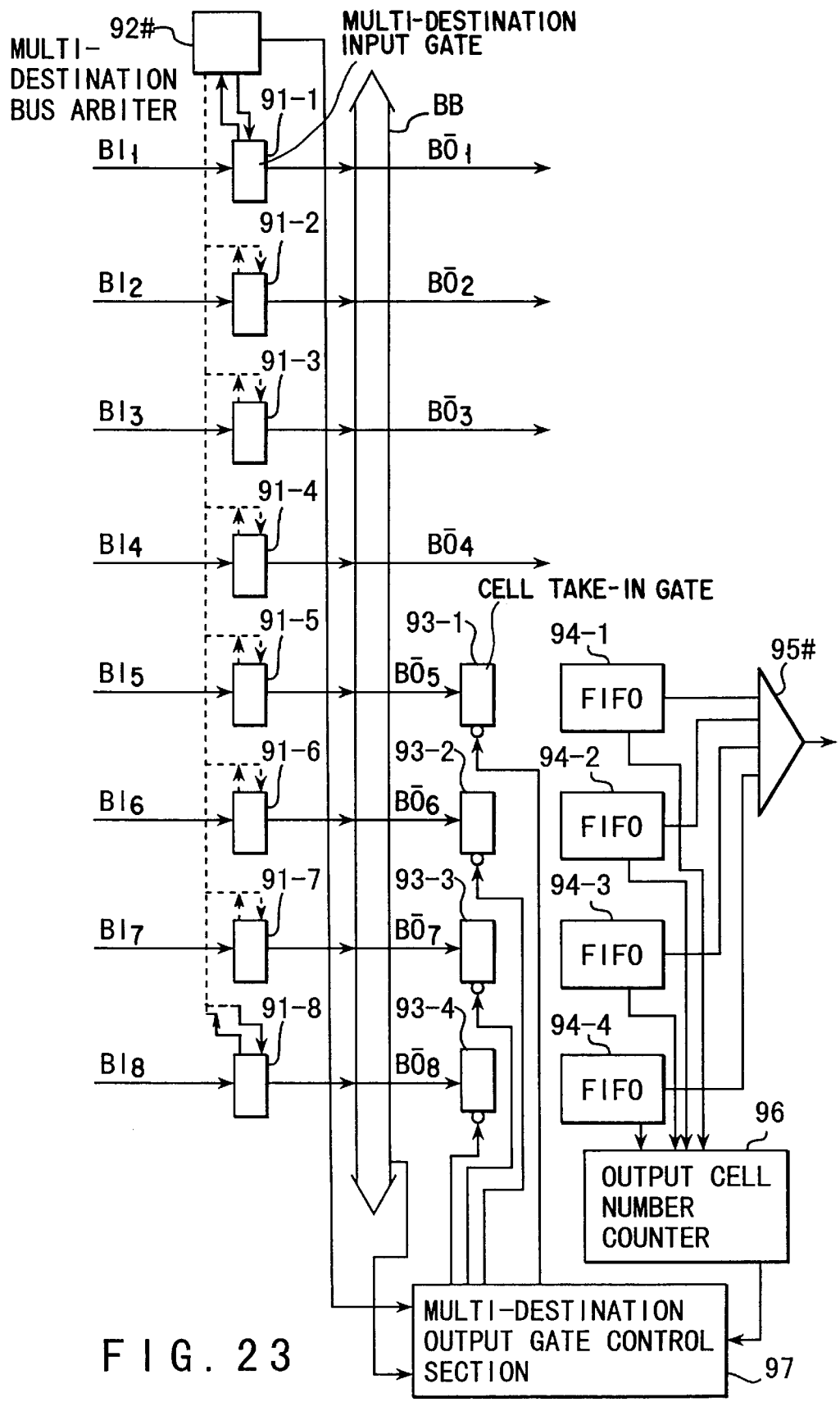
F I G. 23

DATA SWITCHING METHOD AND DATA SWITCHING APPARATUS FOR EFFICIENTLY HANDLING SCAN DATA IN INFORMATION COMMUNICATION NETWORK

BACKGROUND OF THE INVENTION

1. Field of the Invention

The present invention relates to a cell data switching method and a cell data switching apparatus for switching cell data on an ATM (asynchronous transfer mode) information communication network to which computers, controllers, monitors, etc. are connected.

2. Description of the Related Art

Recently, in order to enhance control operations and human interface of monitor information in a process control system, there has been a demand for the advent of an environment in which ordinary physical control information, as well as multimedia data including sound and moving pictures, can be transmitted.

The process control system adopts an information communication network for handing data among computers, controllers, monitors, etc. In particular, in the field of process control in which high-speed data switching on the network is required, an information switching system using common memories (virtual shared memory) is adopted. In this system, each device can access data possessed by another device as if there were no transmission apparatus.

Each device is provided with a common memory with divided address areas corresponding to all respective devices. The device stores its own data in a specific area of its own common memory and sends out the data to the transmission path of the network at a predetermined cycle, thereby to transmit the data to the other devices. Each device receives data from the other devices through the transmission path of the network and stores the received data in the associated areas of its own common memory.

This transmission system is generally called "scan transmission system." In brief, each device receives data from the other devices through the transmission path and stores the received data in the associated area of its own common memory. In addition, each device sends out updated data from the specific area of its own common memory at a predetermined cycle. Thus, data is transferred among the respective devices. In this case, the updated data sent out from the specific area of the common memory of each device to the transmission path is called "scan data."

On the other hand, an ATM (asynchronous transfer mode) information communication network is known as a communication network suitable for transmitting multimedia data. There are a connection type ATM information communication network and a connectionless type ATM information communication network. In the network of either type, all data is transmitted in units of cell data having a fixed length of 53 bytes. Data is transmitted on the ATM information communication network by ATM switch apparatus having ATM switches.

If the ATM information communication network is used for transmission of process control data, an environment is created in which not only physical control information (process control data) but also multimedia data including sound and moving pictures can be transmitted.

However, if the process control data and other data (multimedia data including sound and moving pictures) are mixedly transmitted by using the conventional ATM information communication network, scan data cannot efficiently be scan-transmitted or multi-destination-transmitted among communication nodes provided with switching functions and arranged on the ATM information communication network.

SUMMARY OF THE INVENTION

The object of the present invention is to provide a cell data switching apparatus and a cell data switching method capable of efficiently performing scan transmission.

In this invention, a trunk system is formed for transmitting specified data cells among interconnected cell data switching apparatuses for transferring data in a cell data format. A branch system is formed by connecting terminals to each cell data switching apparatus. In the branch system, data is transferred between the cell data switching apparatus and the terminals, and between the terminals via the cell data switching apparatus. The data switching by the trunk system is performed independently from the data switching by the branch system in each cell data switching apparatus.

According to the present invention, the data switching by the trunk system is performed independently from the data switching by the branch system in each cell data switching apparatus. Thus, terminals which have different transmission capacities or which perform data transmission/reception in a frame format and not in a cell format can be freely connected to the cell data switching apparatuses.

In the present invention, a plurality of cell data switching apparatuses for switching data in a cell data format are combined in a predetermined topological relationship, and specified data cells are switched among the cell data switching apparatuses. A plurality of terminals are connected to the cell data switching apparatuses, and specified data cells are switched between the cell data switching apparatuses and the terminals. The specified data cell switched between the cell data switching apparatuses is stored as specified data in a specified data memory in the cell data switching apparatus. In addition, the specified data cell switched between the cell data switching apparatus and the terminal is stored in the specified data memory in the cell data switching apparatus. The specified data stored in the specified data memory is transferred to destination-side cell data switching apparatuses, terminals, etc.

In the present invention, the cell data switching apparatus manages specified data area information in which a data area to be received from the terminal is designated. Only the specified data corresponding to the data area designated in the specified data area information is transmitted from the cell data switching apparatus to the terminal.

In the present invention, a variable-length frame is used for communication between the cell data switching apparatus and the terminal. A plurality of specified data cells are filled in a data portion of the variable-length frame, and thus the specified data cells is transmitted in one frame.

In the present invention, a protocol identifier indicating the protocol type of the data frame transmitted from the terminal to the cell data switching apparatus is added to the data frame. The cell data switching apparatus which received the data frame from the terminal extracts the protocol identifier from the frame, thereby to determine the type of the data. The received data is stored in a specified data memory associated with the determined data type.

In the present invention, a transmission loop is formed by combining, in a predetermined topological relationship, cell data switching apparatuses for switching data in a cell data format. Each cell data switching apparatus separates a specified data cell from the received data cells in accordance with the identifier included in the cell header. The separated specified data cell is subjected to predetermined process and then multiplexed with other data. The multiplexed data is output to the same link. The specified data cell is preferentially passed through all cell data switching apparatuses.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a functional block diagram of a cell data switching apparatus according to a first embodiment of the present invention;

FIG. 2 is a functional block diagram of a scan data merge section in the apparatus of the first embodiment;

FIG. 3 shows an example of a network structure;

FIG. 4 is a functional block diagram of a scan data merge section according to a second embodiment of the invention;

FIG. 5 shows a data structure of cell data used in the second embodiment;

FIG. 7 is a functional block diagram of a cell removal control section according to a third embodiment of the invention;

FIG. 8 shows a data structure of cell data used in the third embodiment;

FIG. 11 shows the structure of a filtering comparator according to the fourth embodiment;

FIG. 13 shows an example of management data of a terminal control management table in the fifth embodiment;

FIG. 17 shows a relationship between an ETHERNET frame and cell data in a sixth embodiment of the invention;

FIG. 18 shows a data structure of frame data according to a seventh embodiment of the invention;

FIG. 19 is a functional block diagram of a cell data switching apparatus according to an eighth embodiment of the present invention;

FIG. 20 is a functional block diagram of a terminal according to a ninth embodiment of the invention;

FIG. 23 is a functional block diagram of a multi-destination data copy section according to an eleventh embodiment of the invention.

DETAILED DESCRIPTION OF THE PREFERRED EMBODIMENTS

Figure 6:
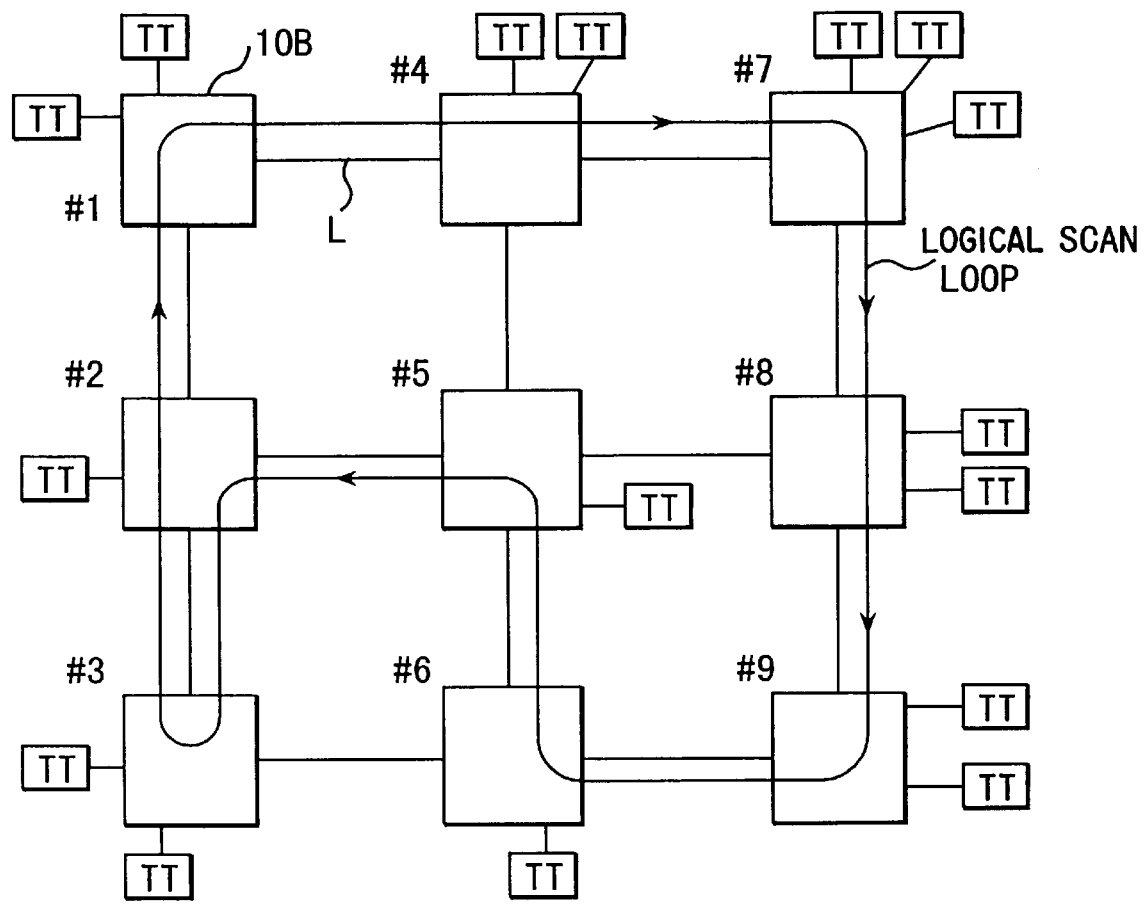
FIG. 6 shows an example of a network structure in the second embodiment.

Embodiments of the present invention will now be described with reference to the accompanying drawings.

First Embodiment

FIG. 1 is a functional block diagram of a cell data switching apparatus according to a first embodiment of the present invention.

In this embodiment, the cell data switching apparatus 10A is connected to other cell data switching apparatuses by four links, connected to ATM terminals (for cell data transmission/reception) by two links, and to a frame type terminal (for frame-format data transmission/reception) by four links.

The cell data switching apparatus 10A has input ports 11a to 11d for receiving cell data from the linked cell data switching apparatus, and output ports 12a to 12d for outputting cell data to the linked cell data switching apparatus. The cell data switching apparatus 10A also has input ports 13a and 13b for receiving cell data from the linked ATM terminal, and output ports 14a and 14b for transmitting cell data to the linked ATM terminal. In addition, the cell data switching apparatus 10A has ports 15a to 15d for transmitting/receiving frame data to/from the linked frame type terminal.

FIG. 3 shows an example of a network structure of an ATM information communication network including a number of cell data switching apparatuses 10A. Symbol SS denotes cell data switching apparatuses 10A, and symbol TT denotes terminals connected directly to the cell data switching apparatuses.

A route (logical scan loop) is formed on a network for transferring the scan data. In the network shown in FIG. 3, a route can be preset to transfer scan data among three cell data switching apparatuses SS in the order indicated by a broken line. Scan data is delivered from the terminal TT to the cell data switching apparatus SS, and the scan data is transferred to the other cell data switching apparatuses SS according to the logical scan loop. The scan data received by each cell data switching apparatus SS is transmitted to the associated terminals TT.

The route for transmitting scan data among the cell data switching apparatuses SS according to the logical scan loop is called "trunk system," and the route for transmitting scan data between the cell data switching apparatus SS and the associated terminal TT is called "branch system." In the cell data switching apparatus 10A shown in FIG. 1, the ports 11a to 11d and 12a to 12d are trunk system ports, and the ports 15a to 15d are branch system ports.

Cell data received at the input ports 11a to 11d of the trunk system from the linked cell data switching apparatus is supplied to associated cell data input sorting sections 16a to 16d. The cell data input sorting sections 16a to 16d check the cell header of the cell data and sorts the plural cell data into scan data and message data.

If the received cell data is message data, it is input to the ATM switch section 17. In the ATM switching section 17, output ports are automatically switched in accordance with the header of the message data. Although the data switching apparatus is connected to the other data switching apparatus by four links, the message data is output to the output port associated with the link corresponding to a virtual path of the message data.

Message data relating to ATM management is input to an ATM managing section 18 via the ATM switching section 17. Management data to be sent to the other cell data switching apparatus is input from the ATM managing section 18 to the ATM switching section 17, and then the management data is output from the ATM switching section 17 to the desired output port.

On the other hand, if the received cell data is scan data, it is not input to the ATM switching section 17 and is input to a scan data merge section 20 from the cell data input sorting sections 16a to 16d via a scan data input switching section 19.

FIG. 2 is a functional block diagram of the scan data merge section 20. The scan data input from the scan data input switching section 19 to the scan data merge section 20 is duplicated by a cell branch section 20a. One unit of the duplicated scan data is sent to a cell merge section 20b, and the other unit of the duplicated scan data is stored in the scan data buffer 21. The scan data input to the cell merge section 20b from the cell branch section 20a is delivered to the next cell data switching apparatus (trunk system) according to the logical scan loop. The scan data stored in the scan data buffer 21 from the cell branch section 20a is delivered to the terminal connected to the cell data switching apparatus 10A.

The scan data buffer 21 temporarily stores scan data in order to take the scan data received from the trunk system into the cell data switching apparatus 10A. In addition, the scan data buffer 21 stores scan data received from the branch system which is to be transmitted from the cell data switching apparatus 10A to the trunk system. The timing for transferring the scan data from the data buffer 21 to the scan data merge section 20b is controlled by a scan data transmission/reception-to/from-switcher control section 23. Specifically, the control section 23 transfers to the scan data buffer 21 the scan data stored in the scan memory 25 from the frame type terminal, etc. in accordance with the cycle and transmission amount determined in relation to the other cell data switching apparatus.

The scan data to be output from the cell data switching apparatus 10A is input to a cell framer 20c from the scan data buffer 21. The cell framer 20c converts the scan data to cell format and supplies the cell data to a cell merge section 20b. The cell merge section 20b effects smooth confluence of the scan data supplied from the trunk system at high speed and the scan data supplied from the cell framer 20c to the trunk system via the cell merge section 20b, and delivers both scan data to an output switching section 22.

A skip line is provided between the scan data input switching section 19 and scan data output switching section 22. The skip line serves to supply the scan data from the trunk system directly to the output switching section 22, without passing the scan data through the scan data merge section 20. In such a case that a closed logical scan loop cannot be formed unless the scan data is passed through the cell data switching apparatus 10A twice or more, the scan data is passed through the skip line to skip the cell data switching apparatus 10A.

Since the logical scan loop is decided in advance, the output port (link) for outputting the scan data is determined in accordance with the cell data switching apparatus from which the scan data has been output. Even if the switching is not effected by the ATM switching section on the basis of the cell header, the output port can be selected in accordance with the logical scan loop and the previous data switching apparatus. Accordingly, only one of the input ports (11a to 11d) of the scan data input switching section 19 is connected to the scan data merge section 21 or scan data transmission in accordance with the set logical scan loop, and another port is connected to the scan data output switching section 22 to skip the cell data switching apparatus 10A. The scan data output switching section 22 is set in accordance with the logical scan loop such that the output from the scan data merge section 20 is delivered to only one output port and the skipped scan data, which skipped the scan data merge section 20, is output to another output port.

In the above manner, the scan data and message data are sent from the scan data output switching section 22 and ATM switching section 17 to the associated ones of output ports 12a to 12d. The output ports 12a to 12d are provided with cell multiplex output sections 26a to 26d. The cell multiplex output sections 26a to 26d multiplex the supplied scan data and message data in a time-division multiplex manner at predetermined time slots and output the multiplexed scan data and message data to the output ports. Thus, the scan data and message data are mixedly sent to the trunk system.

The scan data received from the trunk system and stored in the scan data buffer 21 is transferred to the scan memory 25. In order to store the scan data in the scan memory 25, the scan data transmission/reception-to/from-switcher control section 23 issues a scan data write-in request to an access arbiter 24. The scan data is written at predetermined addresses in the scan memory 25 in accordance with a write signal generated by the access arbiter 24.

The trunk-system scan data stored in the scan memory 25 is sent to the frame type terminal at predetermined cycles (branch system). Gates 25a to 25d associated with the respective frame type terminals are provided. The trunk system scan data is read out from the scan memory 25 in response to the read signal generated from the access arbiter 24 and transmitted to the frame type terminal corresponding to the gate opened by a scan data transmission/reception-to/from-terminal control section 31. The scan data is converted to frame data by data sorting sections 32a to 32d and supplied to the associated ones of branch-system ports 15a to 15d. Accordingly, if the scan data transmission/reception-to/from-terminal control section 31 opens the gates 25a to 25d simultaneously at predetermined cycles, the trunk-system scan data stored in the scan memory 25 is simultaneously transferred to the frame type terminals connected to the cell data switching apparatus 10A. This transmission mode is equivalent to a multi-casting mode as if the cell data switching apparatus 10A multi-cast scan data to a plurality of terminals.

The message data input to the cell data switching apparatus 10A from the input ports 11a to 11d may include cell data directed to the frame type terminal connected to the cell data switching apparatus 10A. On the basis of the cell header of the message data, the ATM switching section 17 outputs to a frame assemble section 27 the cell data directed to the frame type terminal. The frame assemble section 27 forms frame data on the basis of the cell data and stores it in the message memory 28.

Message data is written/read in/from the message memory 28 through a transmission/reception buffer. The transmission/reception buffer is managed by a cell data handler managing section 29. The message data read out from the message memory 28 is converted to frame-format data by the data sorting sections 32a to 32d and then transmitted to the associated one of the branch-system ports 15a to 15d.

The cell data switching apparatus 10A can receive scan data and message data from the frame type terminal of the branch system and output the received data to the output ports 12a to 12d of the trunk system. The data sorting sections 32a to 32d of the branch system sort frame data, which has been input from the ports 15a to 15d, into message data and scan data on the basis of the frame header. The sorted frame-format scan data is passed through the associated gate and stored in the scan memory 25 at a predetermined address. The branch-system scan data stored in the scan memory 25 is fed to the trunk system in the above-described manner. The sorted frame-format message data is stored in the message memory 28 at a predetermined address. When the message data is directed to a terminal connected to the other cell data switching apparatus, the cell data handler managing section 29 reads out the frame-format data from the message memory 28 and delivers it to a cell framer 30. The cell framer 30 disassembles the frame data into cell data and supplies it to the ATM switching section 17. The cell data input to the ATM switching section 17 is transmitted to the other cell data switching apparatus via a predetermined output port in accordance with the cell header in the above-described manner.

The frame data received from the terminal and stored in the scan memory 25 and message memory 28 can be transmitted to another terminal of the branch system. In particular, it is desirable that scan data from each terminal of the branch system be stored in a predetermined area of the scan memory 25, and the scan data transmission/reception-to/from-terminal control section 31 read the trunk-system scan data and the scan data of the terminal at predetermined cycles and transmit the read scan data to each terminal of the branch system.

The cell data switching apparatus 10A is connected to the cell type terminal by two links. The input ports 13a and 13b receive the cell data from the cell type terminal and deliver it to the associated input sorting sections 33a and 33b. The cell data is transferred directly from the input sorting sections 33a and 33b to the ATM switching section 17 and delivered to the desired output ports.

According to the above embodiment, in order to perform multi-destination transmission of scan data, the trunk system comprising a plurality of cell data switching apparatuses connected to form a logical scan loop is separated from the branch system comprising a plurality of terminals connected to each data switching apparatus. Thus, scan data can be transferred at high speed in the trunk system, and scan data can be transferred to only desired terminals in the branch system.

Since the scan data is transmitted to the terminals of the branch system at predetermined cycles with use of the scan memory 25, the functions equivalent to multi-destination (multi-cast) transmission functions can be achieved with simple structure, and the multi-casting with a high degree of freedom, which permits easy switching of the destination apparatus and easy change of transmission cycle, can be performed.

The scan transmission of specific cell data (scan data) among the terminals connected to the single cell data switching apparatus 10A by means of the cell data switching apparatus 10A can be performed independently of the scan transmission of specific cell data (scan data) among the cell data switching apparatuses including the cell data switching apparatus 10A. Different types of terminals with different transmission/reception capacities, such as non-ATM terminals, can be freely connected.

Scan data and message data exchanged among the cell data switching apparatuses and scan data and message data exchanged among the cell data switching apparatus 10A and the associated terminals are stored commonly in the memories 25 and 28. Accordingly, both kinds of data can be transmitted and received efficiently.

Second Embodiment

A cell data switching apparatus 10B according to a second embodiment of the present invention will now be described. In the second embodiment, the cell data switching apparatus 10A according to the first embodiment has a function of removing cell data output from its own node (hereinafter referred to as "self-node"). In this context, the "node" is equal to "cell data switching apparatus."

As is shown in FIG. 4, a cell removal control section 20d is provided in a path through which scan data is input from the input switching section 19 to the scan data merge section 20. In the cell framer 20c', a "self-node", number is set in the cell header and the cell data is sent out to the trunk system. The cell removal control section 20d removes cell data which is received from the trunk system and has a self-node number in the cell header.

FIG. 5 shows a format of cell data transferred among cell data switching apparatuses. The cell data comprises a cell header (5 octets) and an information field (48 octets). A scan identifier is set in the uppermost bit of a VCI (virtual channel identifier) within the cell header, and the self-node number is set in the lower 8 bits of the VCI.

FIG. 6 shows an information communication network in which a plurality of cell data switching apparatuses 10B are interconnected in a mesh-like manner by a dual transmission line L. A logical scan loop is formed to pass through all the cell data switching apparatuses 10B only once for which scan transmission is required. In FIG. 6, numerals #1 to #9 denote cell data switching apparatuses 10B, and symbols TT denote terminals connected to the cell data switching apparatuses 10B. The logical scan loop shown in FIG. 6 is expressed by #1-#4-#7-#8-#9-¥#6-#5-#2-#3-#2-#1.

When the scan data output from the self-node of the cell data switching apparatus #1 is converted to cell data in the cell framer 20c' of the cell data switching apparatus #1, the self-node number is set in the lower 8 bits of the VCI of the cell header. The resultant cell data is sent out from the cell merge section 20b to the output switching section 22. In this manner, the scan data is transferred from the cell data switching apparatus #1 to the cell data switching apparatus #4.

In the cell data switching apparatus #4, the cell data input sorting section (one of 16a through 16d) identifies the scan data on the basis of the scan identifier set in the cell header. The scan data is delivered from the scan data input switching section 19 to the scan data merge section 20 through the cell removal control section 20d.

The cell removal control section 20d determines whether or not the lower 8-bit data of the VCI set in the cell header of the scan data is the self-node number. Since the self-node number of the cell data switching apparatus #1 is set in the lower 8-bit of the VCI, the cell removal control section 20d of the switching apparatus #2 determines that the lower 8-bit data is not the self-node number. As a result, the scan data is passed through the cell removal control section 20d and input to the scan data merge section 20. Then, the scan data is output from the scan data merge section 20 and delivered to the cell multiplex output section (one of 26a through 26d) corresponding to a predetermined output port according to the logical scan loop. That is, the scan data is transferred to the next cell data switching apparatus #7 linked to that output port.

Subsequently, the scan data is similarly transferred among the cell data switching apparatuses according to the logical scan loop.

When the scan data, which has circulated through the logical scan loop, is received by the cell data switching apparatus #1, the cell removal control section 20d checks the lower 8-bit data of VCI set in the cell header. If the cell removal control section 20d identifies its own self-node number, it removes the scan data and does not transfer the data to the scan merge section 20.

Accordingly, the cell data output from the self-node can exactly be removed at that self-node after the scan data has circulated through the logical scan loop. Thus, the used scan cell is prevented from remaining in the information network.

In the above-described second embodiment, the scan identifier, i.e. the self-node number, is set in the VCI of the cell header. However, the scan identifier may be included in a VPI (virtual identifier), a GFC (generative flow control) field, etc. of the cell header. This technique is not limited to the scan transmission loop and is applicable to the case where each node is provided with a path for multi-destination transmission.

Third Embodiment

A cell data switching apparatus according to a third embodiment of the invention comprises the structural elements shown in FIG. 1. The cell removal control section 20d shown in FIG. 4, however, is replaced with a cell removal control section 40 shown in FIG. 7.

The cell removal control section 40 includes an FIFO memory 41 for storing scan data (cell) received by the cell data switching apparatus and successively outputting the scan data in an order of reception. A cell data unit which is just to be output from the FIFO memory 41 is located at the head block of the memory 41. A counter field control section 42 acquires the current value set in the counter field of the cell data transferred to the head block of FIFO memory 41 and increments its own counter value by 1. On the other hand, a maximum value register 43 stores the maximum value of the number of cell data switching apparatuses through which data is passed (hereinafter referred to as "maximum number of times of data passing"). A counter value comparator 44 compares the maximum number of times of data passing stored in the maximum value register 43 with the added counter value output from the counter field control section 42. If the added value set in the counter field of the cell data is less than the maximum number of times of data passing, the counter value comparator 44 opens a cell take-in gate 45 and the received scan data (cell) is taken in. If the added value is not less than the maximum number of times of data passing, the cell take-in gate 45 is not opened and the received scan cell is removed.

Only the cell data taken in from the cell take-in gate 45 is output to the scan data merge section 20 for scan transmission.

FIG. 8 shows the format of the cell data. A counter field is set in the second bit through the eighth bit of the VCI in the cell header. When the cell data switching apparatus outputs the cell data of its own node, the cell framer 20a' sets "0" in the counter field of the cell data.

The number of cell data switching apparatuses through which data is passed in the logical scan loop of the information communication network, as shown in, e.g. FIG. 6 is set in the maximum value register 43 (i.e. the maximum number of times of data passing =8). Each time the cell data having the initial value =0 set in the counter field in the cell data switching apparatus #1 is passed through another cell data switching apparatus according to the logical scan loop, the value in the counter field is incremented by "1" by the counter field control section 42 of each cell data switching apparatus. When the scan data is returned to the first cell data switching apparatus #1 through the logical scan loop, the value in the counter field is "8," and then "1" is incremented. Thus, the current value is "9." Since the value "9" is greater than the maximum number of times of data passing =8, the cell take-in gate 45 is not opened and the cell data is removed. Accordingly, the unnecessary cell data, which has completely circulated, is removed from the trunk system.

In case abnormality occurs in the specified cell data switching apparatus from which the cell data originated, it is possible that the specified cell data switching apparatus fails to remove the scan data originating from its own node. In the above embodiment, however, the value in the counter field of the cell data becomes greater than the maximum number of times of data passing in the next cell data switching apparatus of the logical scan loop. Thus, the condition for removal of cell is established and the unnecessary cell data can exactly be removed in the cell data switching apparatus.

According to the present embodiment, even if the cell data switching apparatus fails to remove the scan data originating therefrom owing to some abnormality, the already used scan data can be removed by the next cell data switching apparatus. Therefore, the used scan cell is prevented from remaining in the network.

Fourth Embodiment

A cell data switching apparatus according to a fourth embodiment of the present invention comprises the structural elements shown in FIG. 1 and additionally includes a cell filtering section for filtering cell data to be taken in the cell data switching apparatus.

Figure 9:
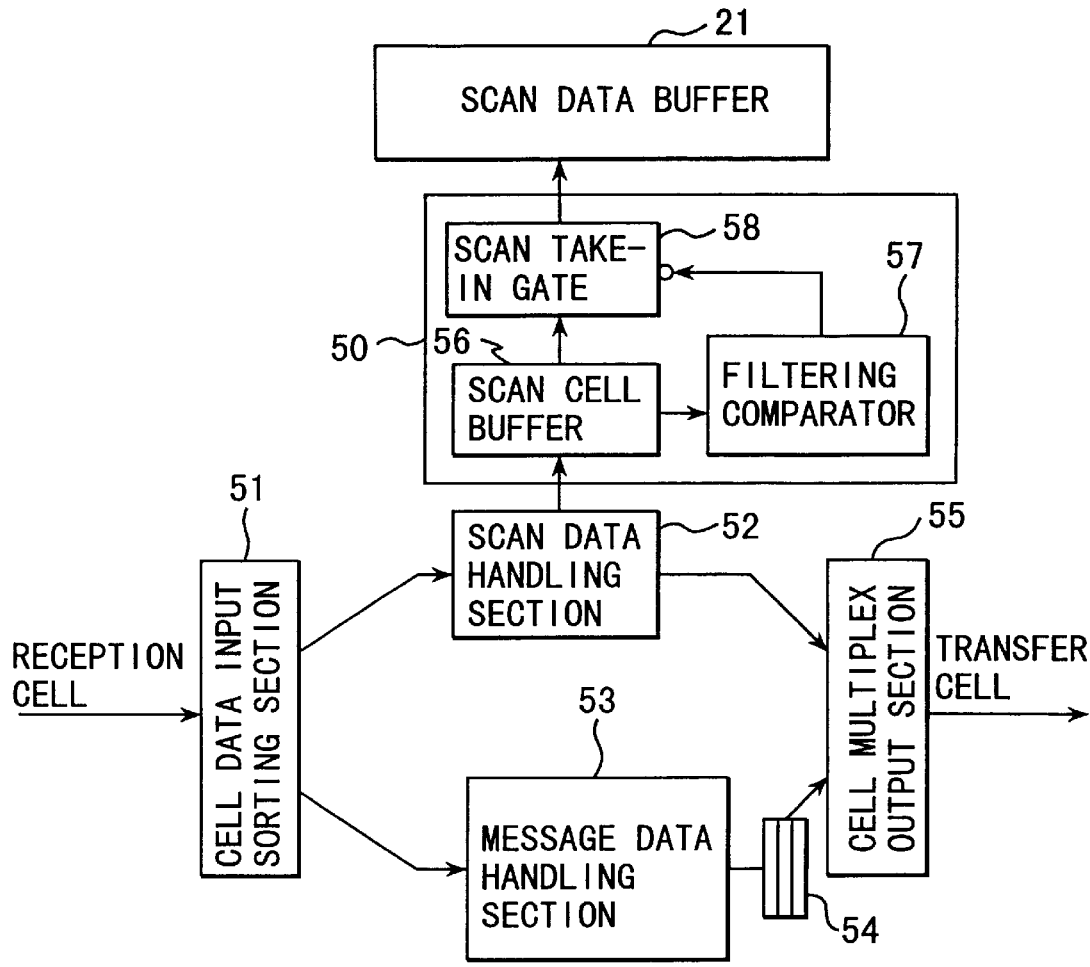
FIG. 9 is a functional block diagram of a part of a cell data switching apparatus according to a fourth embodiment of the invention.

FIG. 9 shows a schematic structure of a cell data switching apparatus including a cell filtering section 50. The cell data input sorting sections 16a to 16d for sorting trunk-system cell data are represented by a block 51. The cell multiplex output sections 26a to 26d for multiplexing message data and scan data are represented by a block 55. In the cell data switching apparatus shown in FIG. 1, the combined structure of the input switching section 19, scan data merge section 20 and output switching section 22 performs a scan data switching operation. This combined structure is represented by a block 52 in FIG. 9. In the cell data switching apparatus shown in FIG. 1, the combined structure of the ATM switching section 17 and ATM managing section 18 performs a message data switching operation. This combined structure is represented by a block 53 in FIG. 9. Reference numeral 54 denotes an FIFO memory.

The cell filtering section 50 is provided on a path through which the scan data switching section 52 delivers scan data branched from the trunk system to the scan data buffer 21. The cell filtering section 50 comprises a scan cell buffer 56 for storing scan data delivered from the scan data switching section 52; a scan take-in gate 58 to which the scan data is supplied from the scan cell buffer 56; and a filtering comparator 57 for controlling the scan take-in gate 58.

Figure 10:
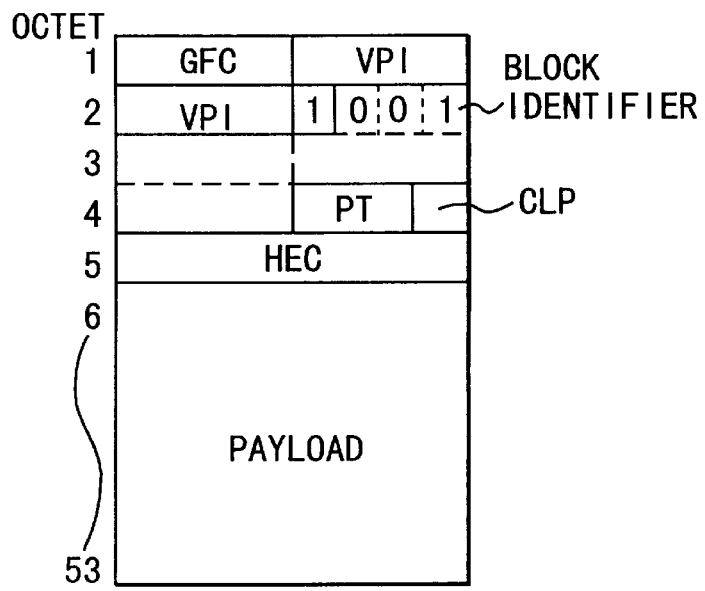
FIG. 10 shows a data structure of cell data used in the fourth embodiment.

FIG. 10 shows the format of the cell data used in the present embodiment. In the cell data, the second to fourth bits of the VCI of the cell header are assigned to the block identifier. In general, in the process control system which requires scan transmission, an address area for scan transmission is provided within the memory space of the system. In the address area for scan transmission, storage addresses for scan data transmitted from the data switching apparatuses or terminals are assigned to the data switching apparatuses or terminals, respectively. The address area usable for scan transmission is divided into a plurality of blocks, and it is determined in units of a block whether or not the scan data is to be taken in the self-node. Value "1" is set in one of the second to fourth bits of the VCI of the cell header, which relates to the block to which the node emitting the cell data belongs. The block identifier shown in FIG. 10 indicates that the cell data is output from the data switching apparatus or terminal belonging to the third block.

FIG. 11 shows the structure of the filtering comparator 57. Bit data indicating the take-in block is restored in a 3-bit register, and the block identifier extracted from the cell header of the scan data is latched in a latch section. If both bit data in the 3-bit register and latch section coincide, a bit comparator outputs an enable signal to the scan take-in gate 58.

In this cell data switching apparatus, the cell data input sorting section 51 sorts the cell data into scan data and message data. The scan data is duplicated in the scan data switching section 52, one of the duplicated data units is sent to a predetermined output port and delivered to the trunk system. The message data to be sent to the next cell data switching apparatus is transferred from the message data switching section 53 to the cell multiplex output section 55 via the FIFO memory 54. The scan data and message data are mixedly sent to the next cell data switching apparatus.

The other of the duplicated scan data units produced by the scan data switching section 52 is stored in the scan cell buffer 56 of the cell filtering section 50. The filtering comparator 57 determines whether the scan data stored in the scan cell buffer 56 is to be taken in.

In the filtering comparator 57, the 3-bit register stores the bit data designating the block to be taken in the self-node. If the bit data in the 3-bit register is "101", the scan data of the first and third blocks are taken in.

In the filtering comparator 57, the bit comparator compares the block identifier set in the cell header of the cell data stored in the head of the scan cell buffer 56 with the bit data stored in the 3-bit register (filtering register). For example, if the block identifier in the cell header is "100" or "001," the block is determined to be taken in and the cell take-in gate 58 is opened. Thus, the scan data is stored in the scan data buffer 21. The scan data stored in the scan data buffer 21 is transferred to the scan memory 25 and transmitted to the terminal at a predetermined cycle, as described above.

The block identifier indicating the origin of cell data transmission is set in the second to fourth bits of the VCI of the cell data in the cell data switching apparatus which is the origin of cell data transmission. On the other hand, the block necessary for the self-node is stored in the register of the filtering comparator 57. Thus, only the scan data necessary for the self-node can be taken in.

The number of bits of the block identifier in the cell header is not limited to three, and may be set to a number corresponding to the number of divisions of the address area usable for scan transmission.

Fifth Embodiment

A fifth embodiment of the invention relates to a method of efficiently transmitting scan data between the cell data switching apparatus shown in FIG. 1 and the terminal by using the scan memory 25. The cell data switching apparatus receives, from each terminal, scan data area information (head pointer, start address, end address) of scan data to be received by the terminal at each cycle, and transmits scan data among terminals at different cycles on the basis of the scan data area information.

Figure 12:
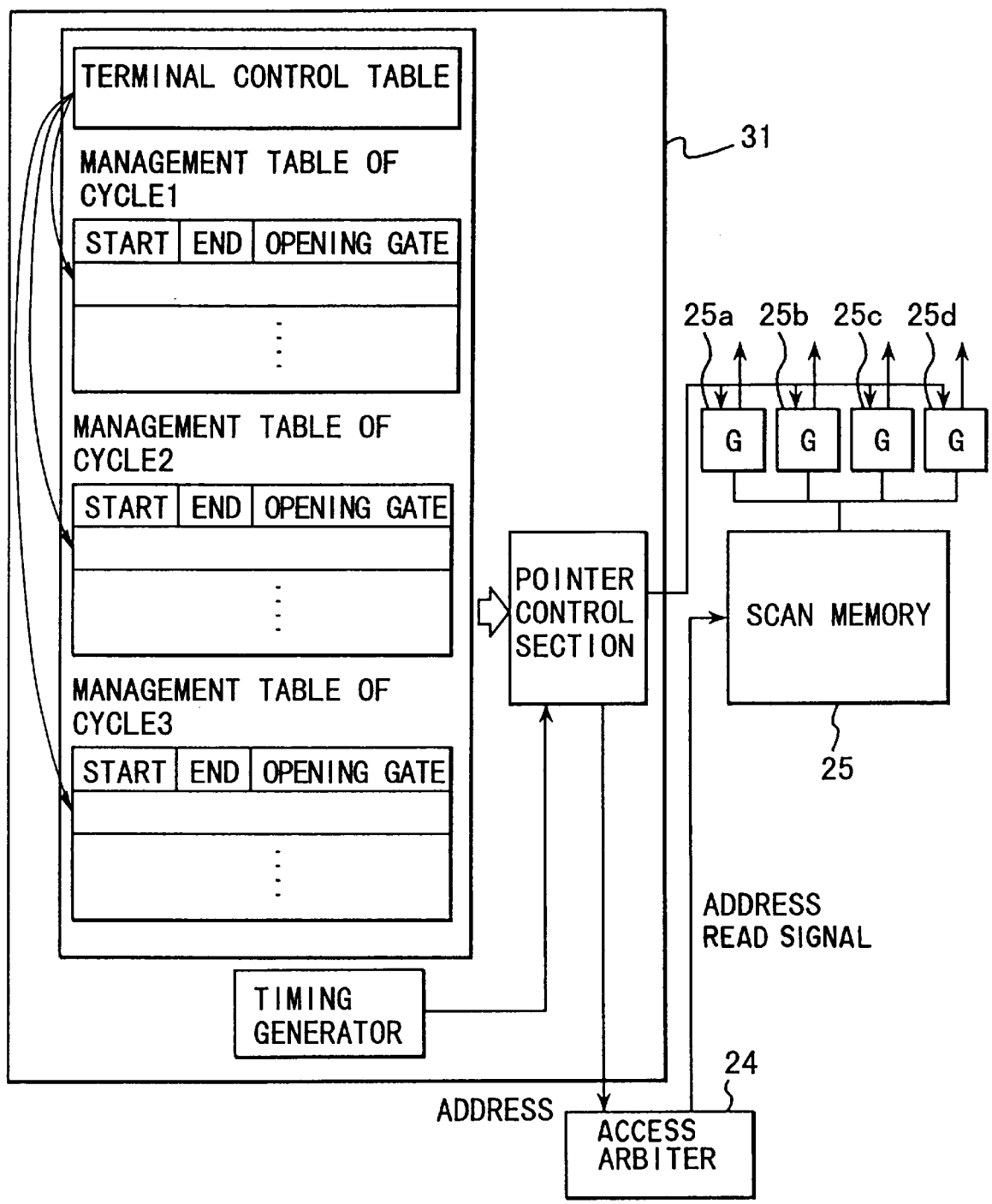
FIG. 12 is a conceptual figure of a scan data transmission/reception-to/from-terminal control section according to a fifth embodiment of the invention.

As is shown in FIG. 12, the scan data transmission/reception-to/from-terminal control section 31 comprises a terminal control information table for managing the scan data area information received from each terminal, and management tables of different cycles in which read-out addresses are associated with opening gates (i.e. gates to be opened). On the basis of the management table information, a pointer control section generates read-out addresses and opens gates associated with terminals to which scan data is to be transmitted.

FIG. 13 shows a specific example of scan data area information stored on the terminal control information table. In the example of FIG. 13, four terminals are connected to the cell data switching apparatus, and scan data is transmitted to terminals at three cycles (cycle 1, cycle 2 and cycle 3). For example, the cell data switching apparatus transmits to the associated terminals the scan data received from the other cell data switching apparatus and stored in the scan memory 25 at cycle 1=1 msec, cycle 2=50 msec and cycle 3=1 sec.

As shown in FIG. 13, head pointers of scan areas for respective terminals and respective cycles are managed. A start address (Start) of the scan area is set at the position of the head pointer, and the start address is followed by an end address (End) of the scan area. The area storing the data to be received by the terminal at a specific cycle is specified by the start address and end address. When "END" is described at the position of the head pointer, the associated terminal requires no scan transmission at the associated cycle.

In the present embodiment, when the reception scan data has been stored in the scan memory 25, the head pointer is detected on the basis of the terminal connected to the cell data switching apparatus and the scan cycle. The read-out of the scan data starts at the start address set at the position of the head pointer and ends at the end address. The data read out from this specified scan range is sent to the associated terminal.

The above technique will now be described in greater detail with reference to FIGS. 14 to 16A and 16B.

Figures 14, 15, 16A, 16B:
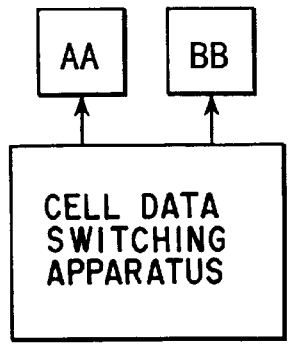
FIG. 14 shows a relationship between a cell data handler and a terminal.
FIG. 15 is a schematic diagram of a scan data area in a scan memory.
FIG. 16A shows a specific example of management data of a terminal control management table.
FIG. 16B shows a specific example of management data stored in the management table for each cycle.

For the purpose of simplicity, suppose that two terminals AA and BB are connected to the cell data switching apparatus, as shown in FIG. 14, and scan data is transmitted at two cycles (cycle 1=10 msec; cycle 2=100 msec). As is shown in FIG. 15, the scan memory 25 comprises storage areas 0 to 6 as areas for storing scan data.

The terminals AA and BB transmit in advance the scan data area information, as shown in FIG. 16A, to the cell data switching apparatus. The scan data transmission/reception-to/from-terminal control section 31 stores the received scan data area information on the terminal control information table. The terminal AA, as shown in FIG. 16A, requests that the cell data switching apparatus transmit to the self-node (AA) the scan data of areas 0 to 2 in the scan memory 25 at the cycle of 10 msec and the scan data of areas 3 to 5 at the cycle of 100 msec. Similarly, the terminal BB requests that the cell data switching apparatus transmit to the self-node (BB) the scan data of area 0 in the scan memory 25 at the cycle of 10 msec and the scan data of areas 3 to 6 at the cycle of 100 msec.

On the basis of the scan data area information shown in FIG. 16A, the scan data transmission/reception-to/from-terminal control section 31 generates a cycle-basis management table, as shown in FIG. 16B, which is suitable for read-out control of the gates 25a to 25d and scan memory 25. Specifically, scan data of area 0 of scan memory 25 is read out at the cycle of 10 msec and in this case the gates corresponding to the terminals AA and BB are opened. Scan data of areas 1 and 2 is read out at the cycle of 10 msec and in this case the gate corresponding to the terminal AA is opened. Similarly, scan data of areas 3 to 5 is read out at the cycle of 100 msec and in this case the gates corresponding to the terminals AA and BB are opened. Scan data of area 6 is read out at the cycle of 100 msec and in this case the gate corresponding to the terminal BB is opened.

In this manner, the pointer control section reads out the read-out address and gate opening information from the management table at each associated cycle, and delivers the read-out address to the access arbiter 24 and opens the associated gate. The access arbiter 24 reads out the scan data of the read-out address while preventing the scan data from interfering with the data write/read associated with other nodes.

The scan data read out from the scan memory 25 is sent to the associated sorting section via the opened gate and converted to frame-format data (i.e. frame data). The frame data is sent to the terminal associated with the opened gate.

According to this embodiment, the cell data switching apparatus receives the scan data area information from the terminal. On the basis of the scan data area information, only the data cell stored in the specified area is sent to the terminal. Thus, the data cell to be received by the terminal can be freely chosen.

It is possible that reception scan areas are managed for respective cycles of the terminals so that desired scan data is selected on the terminal side and received by the terminal.

Sixth Embodiment

In a sixth embodiment of the invention, data is exchanged between the cell data switching apparatus and the terminal by using an ETHERNET frame having a data structure as shown in FIG. 17. The cell data switching apparatus has the same structure as that shown in FIG. 1. In this embodiment, a plurality of cell data units are derived from an ETHERNET frame, and a plurality of cell data units are filled in an ETHERNET frame.

The ETHERNET frame can contain data of 1500 octets in a data area. If a cell-type scan data unit comprises 48 octets, the terminal can transmit 31 cell data (scan data) units (1500±48=31) at maximum in one frame.

In this embodiment, if the cell data switching apparatus receives the ETHERNET frame from the terminal, scan data cells are derived from the ETHERNET frame and the scan data cells are stored in a predetermined area of the scan memory 25. The scan data stored in the scan memory 25 can be transmitted to other cell data switching apparatus. When the scan data stored in the scan memory 25 of the cell data switching apparatus is transmitted to the terminal, 31 cell-type scan data units at maximum can be filled in one ETHERNET frame.

In the terminal which received the ETHERNET frame, the scan data is derived from the ETHERNET frame and stored in the memory of the self-node (terminal).

According to the present embodiment, a plurality of cell-type scan data units are filled in one frame and transferred between the cell data switching apparatus and the terminal. Therefore, the efficiency of transmission can be enhanced.

The media for frame transmission between the cell data switching apparatus and terminal is not limited to ETHERNET and may be applied to all media for frame-base communication such as FDDI, Fibre Channel, etc.

Seventh Embodiment

In a seventh embodiment of the invention, the cell data switching apparatus is connected to an ETHERNET terminal via an ETHERNET link. The cell data switching apparatus has basically the same structure as that shown in FIG. 1.

In this embodiment, frame data having a format as shown in FIG. 18 is transmitted between the cell data switching apparatus and the terminal connected via the ETHERNET link. A protocol type is designated in a TYPE field of the frame data. In the terminal, a value indicating the protocol type is set in the TYPE field of the frame.

In the cell data switching apparatus which has received the frame data from the terminal, the terminal data sorting sections 32a to 32d read the protocol type designated in the TYPE field of the frame data. If the protocol type designated in the TYPE field is expressed by a value representing the scan data, the terminal data sorting sections 32a to 32d transfer the received data to the scan memory 25. Otherwise, the sorting sections 32a to 32d transfer the received data to the message memory 27.

According to the present embodiment, the storage memory is determined in accordance with the protocol type designated in the TYPE field of frame data. Thus, there is no need to temporarily write the scan data in the message memory 27. The scan data can be written directly in the scan memory 25. Accordingly, excess inter-memory transfer time is eliminated and the scan data can be processed at high speed.

Eighth Embodiment

FIG. 19 shows functional blocks of a cell data switching apparatus 10C according to an eighth embodiment of the invention. The structural elements having functions common to the functions of the elements shown in FIG. 1 are denoted by like reference numerals.

In the present embodiment, a plurality of terminals are connected to the cell data switching apparatus via the ETHERNET link. Data received via the ETHERNET link is supplied to an ETHERNET transmission/reception section 71 via ports 15a' to 15d'. The data received by the ETHERNET transmission/reception section 71 is sent to an ETHERNET switch 70.

The ETHERNET switch 70 performs message handling operations among terminals and stores in the message memory 28 messages to be sent to the other cell data switching apparatus and messages received by the cell data switching apparatus 10C and also stores in the scan memory 25 the scan data to be sent to the other cell data switching apparatus and scan data received by the cell data switching apparatus 10C.

According to this embodiment, a plurality of terminals are connected to the cell data switching apparatus via the switching mechanism and the data transmission/reception among the terminals is effected by the switching mechanism. Thus, the efficiency of data handling among the terminals is enhanced when the traffic amount of messages is high.

The ETHERNET link may be replaced with an FDDI, and the ETHERNET link may be replaced with an FDDI switch.

Ninth Embodiment

FIG. 20 shows functional blocks of a terminal for transmitting and receiving cell-type data according to a ninth embodiment of the invention. The terminal comprises a transmitter 80 for transmitting cell data and a receiver 81 for receiving cell data. The transmitter 80 and receiver 81 are connected, for example, to the aforementioned ports 13a and 13b of the cell data switching apparatus. A cell framer 82 provided in the terminal extracts an SDH (Synchronous Digital Hierarchy) frame from a reception cell data flow received by the receiver 81 and adds the SDH frame to the transmission cell data flow to be transmitted from the transmitter 80. A routing tag control section 83 adds a routine tag necessary for switching in a terminal ATM switch 84 to the cell data extracted by the cell framer 82, and removes the routing tag from the cell data to be transmitted from the transmitter 80.

The terminal ATM switch 84 delivers that portion of the received cell data to an AAL process section 85, which is to be processed by a microprocessor 87 of the terminal, and also delivers that portion of the received cell data to an AAL process section 85-1 and an ALL process section 85-2, which is to be handled by input/output (I/O) sections 88 and 89 of the terminal. In addition, the terminal ATM switch 84 delivers to the transmitter 80 the transmission cell data supplied from the AAL process sections 85, 85-1 and 85-2.

The data transferred from the terminal ATM switch 84 to the AAL process section 85 as data to be processed by the microprocessor 81 is converted to frame-format data in a memory 86. The data transferred from the terminal ATM switch 84 to the AAL process sections 85-1 and 85-2 is delivered to the I/O sections 88 and 89. On the other hand, the data stored in the data memory 86 and the data in the I/O sections 88 and 89 are transmitted to other terminals via routes reverse to those in the reception mode.

For example, when the reception cell data delivered from the cell framer 82 is data such as image data or sound data, which need not be processed by the microprocessor 87, the routing tag control section 83 adds to the data such a routing tag that the data may not flow to the bus and may flow via the I/O sections 88 and 89. The data with the routing tag is delivered to the terminal ATM switch 84. When the reception cell data is data to be processed by the microprocessor 87, the routing tag control section 83 adds to the data such a routing tag that the data may flow to the bus and delivers the data with the tag to the terminal ATM switch 84.

When image data, sound data and other data is to be transmitted from the self-node to other terminals, the data is delivered to the terminal ATM switch 84 via different routes through processes reverse to those in the reception mode. The transmission data is output from the terminal ATM switch 84 to the ports connected to the cell data switching apparatus.

According to the present embodiment, the terminal is provided with the terminal ATM switch 84 and the data which need not be processed by the microprocessor 87 is delivered directly to the I/O sections without flowing via the data memory 86. Thus, interference between different kinds of transmission/reception data is reduced to a minimum, and a bus bottleneck is prevented from occurring at a transmission/reception section of a network terminal.

Tenth Embodiment

Figure 21:
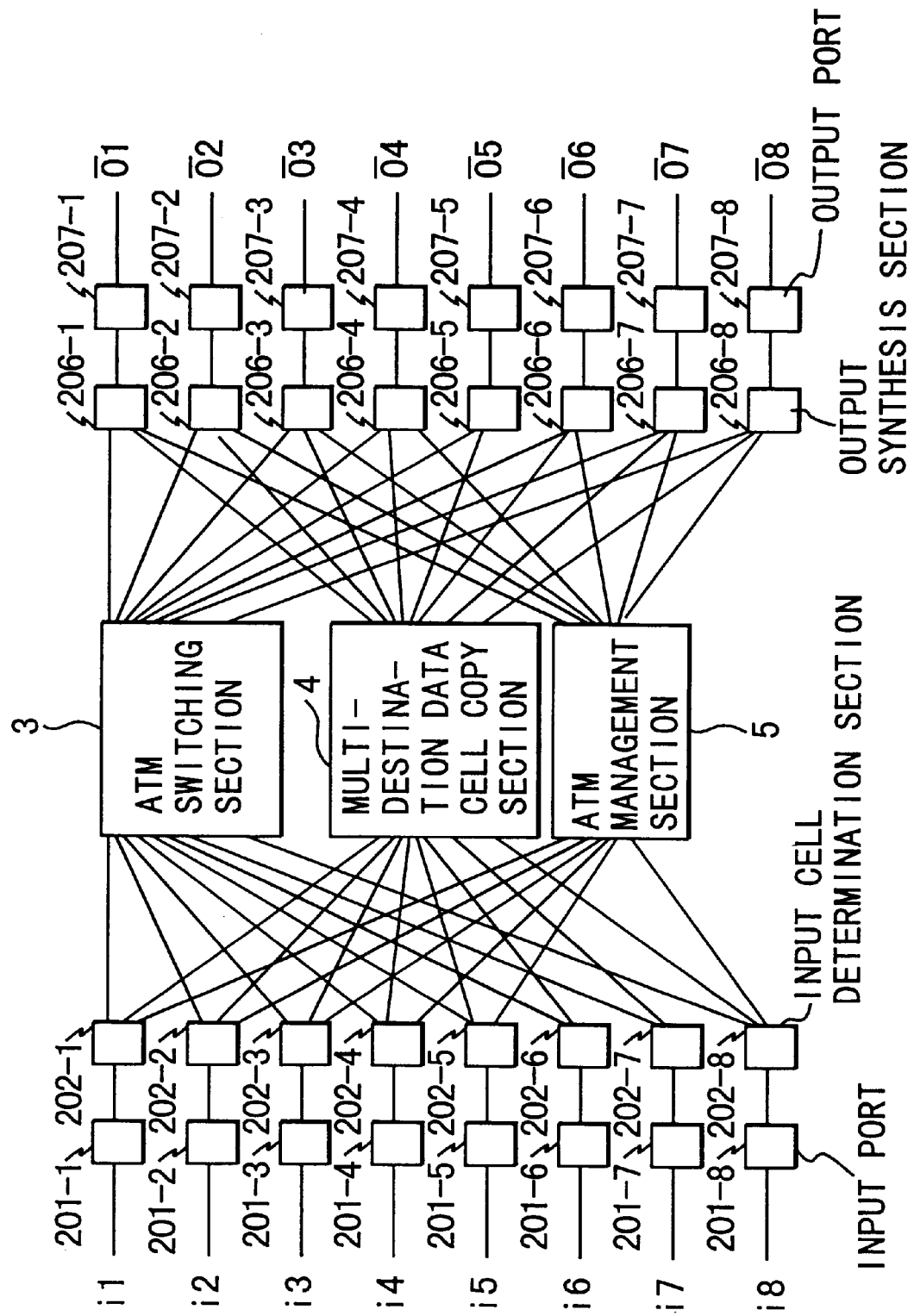
FIG. 21 is a functional block diagram of a cell data switching apparatus according to a tenth embodiment of the present invention.

FIG. 21 shows the entire structure of a cell data switching apparatus according to a tenth embodiment of the invention.

This cell data switching apparatus comprises input ports 201-1 to 201-8 receiving cell data from input lines i1 to i8; input cell determination sections 202-1 to 202-8 for determining the type of cell data input from the input ports 201-1 to 201-8; an ATM switching section 203; a multi-destination data cell copy section 204; an ATM management section 205; output cell synthesis sections 206-1 to 206-8; and output ports 207-1 to 207-8 for outputting cell data to output lines 01 to 08.

In the case where this cell data switching apparatus is applied, for example, to the network shown in FIG. 3, if links are provided between this cell data switching apparatus and the other cell data switching apparatuses SS and terminals TT, the input ports 201-1 to 201-8 corresponding to the respective links receive the data transmitted from the other cell data switching apparatuses SS and terminals TT. The data, which is to be transmitted to the other cell data switching apparatuses SS and terminals TT via routes selected by this cell data switching apparatus (self-node), is supplied to the output ports 207-1 to 207-8 corresponding to the respective links. In other words, in the cell data switching apparatus, the trunk system is separated from the branch system.

The input cell determination sections 202-1 to 202-8 determine the kind of the received cell data and sort the cell data into scan data, message data, etc. The cell-format scan data is sent from the input cell determination sections 202-1 to 202-8 to the multi-destination data copy section 204. The cell-format message data is input to the ATM switching section 203. The cell-format ATM management data is input to the ATM management section 205.

When the scan data is ordinary multi-destination communication cell data, the multi-destination data copy section 204 distributes the cell data to all output sections. When the scan data is group-multi-destination communication cell data, the multi-destination data copy section 204 distributes the cell data only to specific output sections.

The output cell synthesis sections 206-1 to 206-8 mix the message data supplied via routes selected by the ATM switching section 203 and the scan data supplied via routes selected by the multi-destination data copy section 204 so that the message data does not interfere with the scan data. The mixed data is sent to the output ports.

Figure 22:
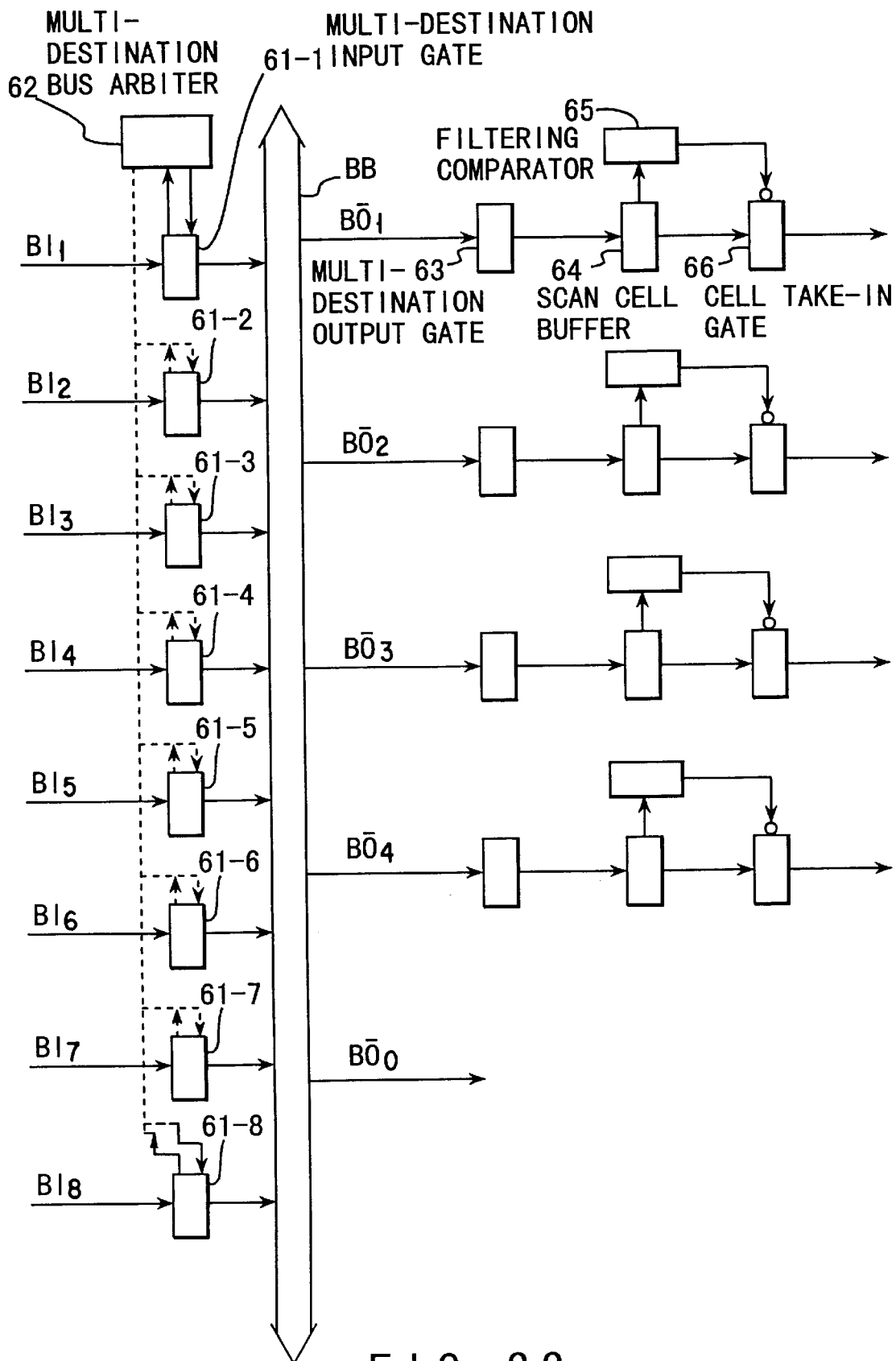
FIG. 22 is a functional block diagram of a multi-destination data copy section according to the tenth embodiment.

FIG. 22 shows the structure of the multi-destination data copy section 204.

In this multi-destination data copy section 204, multi-destination inputs (BI1 to BI8) are supplied from the input cell determination sections 202-1 to 202-8 to multi-destination input gates 61-1 to 61-8. The multi-destination inputs (BI1 to BI8) are fed to a single multi-destination communication bus BB via the associated multi-destination input gates 61-1 to 61-8.

In this multi-destination data copy section 204, five multi-destination outputs (BO1 to BO4 and BO0) delivered from the bus BB. In FIG. 21, the multi-destination data copy section 204 has eight outputs, but the remaining three outputs are not shown in FIG. 22. Five multi-destination outputs (BO0 to BO4) are sent to the output ports (e.g. 207-1 to 207-4) linked to the terminals, and the remaining multi-destination output BO0 is sent to the output port (e.g. 207-5) linked to the other cell data switching apparatus.

If multi-destination scan data is input to any one of the input ports (BI1 to BI8), the scan data is delivered to the multi-destination input gate (one of 61-1 to 61-8) associated with the input port. Then, the scan data is permitted by a multi-destination bus arbiter 62 to go to the multi-destination communication bus BB. The cell data is output from the bus BB to associated signal lines as the five multi-destination outputs (BO0 to BO4).

The output ports linked to the terminals receive all cell data delivered to the buss BB. It is thus necessary to send to the output ports only the data required by the linked terminals.

To cope with this problem, each of the output ports (BO1 to BO4) filters cell data. Specifically, the cell data which the multi-destination output gate 63 received from the buss BB is stored in a scan cell buffer 64. A filtering comparator 65 having the same structure as the filtering comparator 57 shown in FIG. 11 compares the block identifier set in the cell header of cell data stored at the head of the scan cell buffer 64 with the bit data in the filtering register. For example, if there is a common bit "1" like the preceding embodiment, the received data cell is determined to be taken in and a cell take-in gate 66 is opened. Thus, transmission of the scan data to the terminal is permitted.

On the other hand, the multi-destination output BO0 is delivered from the bus BB to the output port linked to the other cell data switching apparatus. The output BO0 is sent from the output port directly to the other cell data switching apparatus linked to the output port.

According to this embodiment, the information representing the take-in block at the self-node is compared with the block identifier of the reception cell data at the output ports of the cell data switching apparatus, and only the necessary data is taken in. Thus, high-speed reception select is effected for each port.

Eleventh Embodiment

A data cell switching apparatus according to an eleventh embodiment of the invention has an entire structure as shown in FIG. 21. The multi-destination data copy section provided in the data cell switching apparatus, however, is constructed as shown in FIG. 23.

In the multi-destination data copy section, eight multi-destination inputs (BI1 to BI8) are supplied to the multi-destination communication bus BB via the associated multi-destination input gates 91-1 to 91-8. Four (BI1 to BI4) of the eight multi-destination inputs are cell data units supplied from the terminal, and the other four (BI5 to BI8) are cell data units from the other cell data switching apparatus.

If multi-destination scan data is input to any one of the input ports (201-1 to 201-8), the multi-destination bus arbiter 92 associated with the input port mediates output of the scan data to the bus BB in response to the output request by the multi-destination input gate 91.

The cell data sent out to the multi-destination communication bus BB is output from the bus BB as eight multi-destination outputs BO1 to BO8. The multi-destination outputs (BO1 to BO4) are supplied to the link connected to the terminal, and the other multi-destination outputs (BO5 to BO8) are supplied to the link connected to the other cell data switching apparatus.

The multi-destination outputs (BO5 to BO8) to be transmitted to the other cell data switching apparatus are input to FIFO memories 94-1 to 94-4 via associated multi-destination output gates 93-1 to 93-4. Outputs from the FIFO memories 94-1 to 94-4 are delivered to a single output data multiplex section 95 and then transferred to the other cell data switching apparatus.

The number of cells stored in each of the FIFO memories 94-1 to 94-4 is monitored by an output cell number counter 96 for each port. Based on the monitored result, a multi-destination output gate control section 97 controls the multi-destination output gates 93-1 to 93-4. When the cell data is sent to the multi-destination communication bus BB, the multi-destination output gate control section 97 opens the multi-destination output gate 93 of the port with the least number of stored cells. Thus, the cell data is stored in the associated FIFO 94.

According to this embodiment, the cell data from the input ports connected to other cell data switching apparatus by four links can be transmitted to other cell data switching apparatus from the output port connected to the cell data switching apparatus by one link. Thus, the transmission capacity for one link can be increased.

When the multi-destination outputs BO5 to BO8 to be output from the bus BB to the other cell data switching apparatus is delivered to the single output port, the data is taken in through the gate associated with the output buffer or FIFO memory (one of 94-1 to 94-4) having the least number of stored cells. Thus, the cells can efficiently be stored in the output buffer.

It is possible that the output cell number 96 does not monitor the number of stored cells in each of the FIFO memories 94-1 to 94-4 and, instead, a signal representing the number of stored cells in each of FIFO memories 94-1 to 94-4 is output to the multi-destination output gate control section 97.

Twelfth Embodiment

Figure 24:
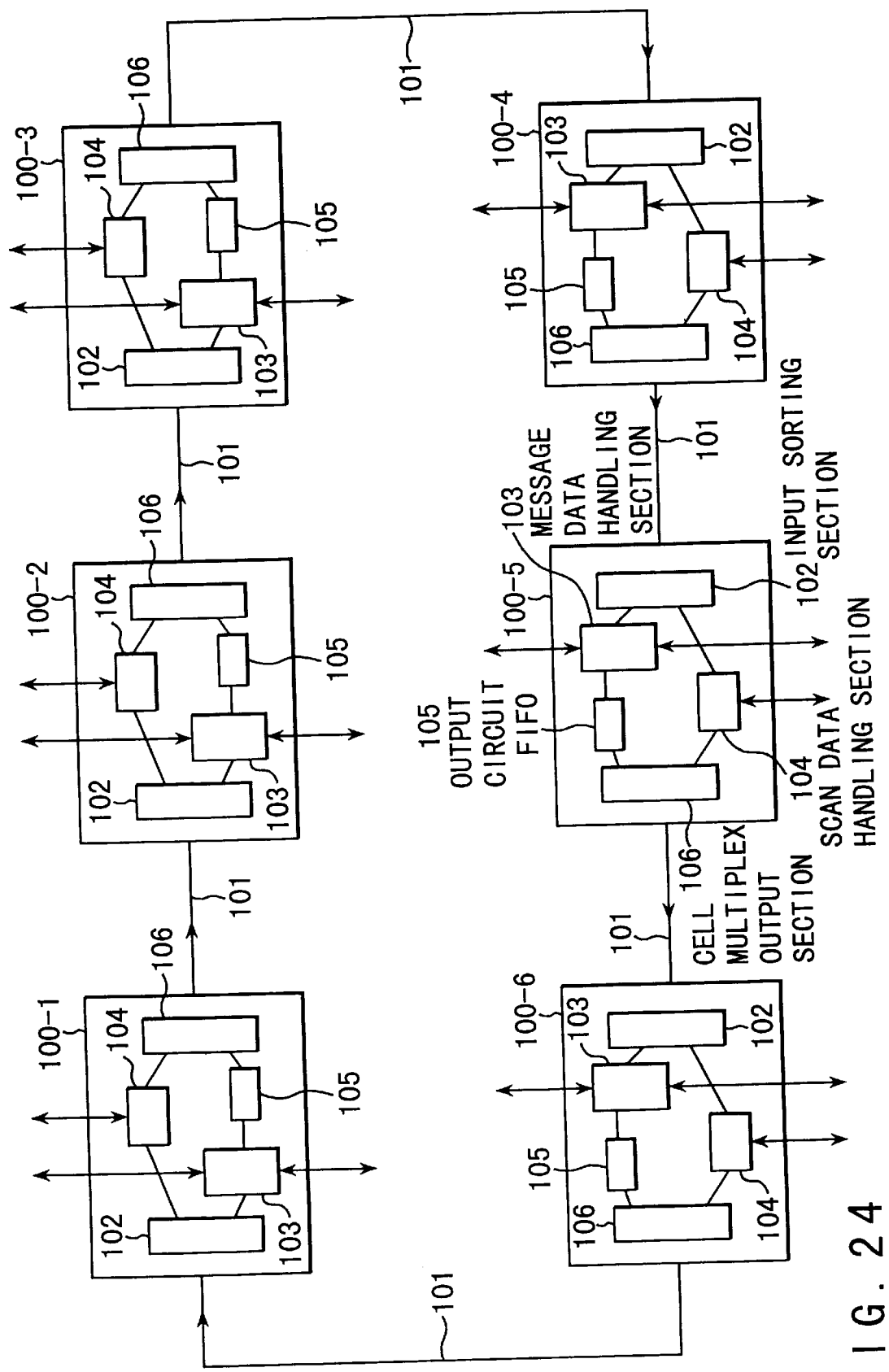
FIG. 24 shows the structure of an information communication network according to a twelfth embodiment of the invention.

FIG. 24 shows an information network in which a plurality of cell data switching apparatuses 100-1 to 100-6 are connected in a loop by a transmission path 101. Each cell data switching apparatus 100 comprises a cell data input sorting section 102 for sorting cell data received from other cell data switching apparatus into scan data and message data; a message data switching section 103 for delivering the message data sorted by the cell data input sorting section 102 to a desired port; a scan data switching section 104 for outputting the scan data sorted by the cell data input sorting section 102 to a desired port; an output FIFO memory 105 for successively storing message data to be transmitted to other cell data switching apparatus; and a cell multiplex output section 106 for multiplexing the message data and scan data and transmitting the multiplexed data to the other cell data switching apparatus. When the message data and scan data are multiplexed, the cell multiplex output section 106 outputs the scan data preferentially. Only when there is no scan data to be transmitted, does the cell multiplex output section 106 outputs the message data.

In the present embodiment, cell data originating from one cell data switching apparatus is successively transferred in a loop. In this case, when there is scan data to be transmitted to other cell data switching apparatus, the cell multiplex output section 106 of each cell data switching apparatus 100 always sends out the scan data in preference to message data. Only when there is no scan data to be transmitted, does the cell multiplex output section 106 reads out message data from the head portion of the output FIFO memory 105 and outputs the message data.

Therefore, the scan data can be preferentially transmitted through each cell data switching apparatus, and the delay time of scan data can be determined.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data switching method for a data switching apparatus which operates as one of a plurality of data switching nodes arranged on an ATM network, the plurality of data switching nodes forming a trunk system, wherein the data switching apparatus and at least one terminal form a branch system, said data switching method comprising:

performing a first data switching operation for the branch system, wherein data is transmitted between said data switching apparatus and said at least one terminal; and performing a second data switching operation for the trunk system, independently of the first data switching operation, wherein data is transmitted along a predetermined transmission path from an upstream-side data switching node of the plurality of data switching nodes to a downstream-side data switching node of the plurality of data switching nodes;

wherein the second data switching operation for the trunk system includes the substeps of (i) sorting data transmitted from said upstream-side data switching node into scan data and message data, (ii) duplicating the scan data to generate duplicate scan data and (iii) scan-transmitting one of the scan data and the duplicate scan data to said downstream-side data switching node and (iv) transmitting the message data to said downstream-side data switching node, and wherein the second data switching operation for the branch system includes a step of scan-transmitting a remaining one of the scan data and the duplicate scan data to said at least one terminal connected to said data switching apparatus.

2. The data switching method according to claim 1, wherein said method further comprises the steps of:

taking a remaining one of the scan data and the duplicated scan data into said data switching apparatus;

storing in a scan memory the data unit taken in the data switching apparatus; and reading the data from the scan memory at a predetermined cycle and scan-transmitting to a predetermined terminal the data read out.

3. The data switching method according to claim 1, wherein said method comprises the steps of:

setting an identifier of said data switching apparatus to a header of a cell data which is newly transmit from the data switching apparatus to the downstream-side data switching node; and removing the cell data input from the upstream-side data switching node when an identifier set in a header of cell data coincides with the identifier of the data switching apparatus.

4. The data switching method according to claim 1, wherein said method further comprises the steps of:

providing a counter field in a header of a cell data which is newly transmitted from the data switching apparatus to the downstream-side data switching node;

adding a value to a counter field of cell data input from the upstream-side data switching node; and removing the cell data received from the upstream-side data switching node when a value of the counter field of the cell data exceeds a predetermined value.

5. The data switching method according to claim 1, wherein said method further comprises the steps of:

dividing the plurality of data switching nodes into plural blocks of nodes;

setting a block identifier of a header of a cell data which is newly transmitted from the data switching apparatus to the downstream-side data switching node, said block identifier indicating one block of the plural blocks of nodes from which said cell data originated; and comparing a block identifier indicating blocks to be taken in by the data switching apparatus with the block identifier set in the header of the cell data input from the upstream-side data switching node; and filtering, in units of blocks, the cell data to be taken in by the data switching apparatus.

6. The data switching method according to claim 2, wherein said method further comprises the steps of:

receiving, from the at least one terminal, data area information indicating which of the scan data stored in the scan memory needs to be transmitted;

opening a transmission gate associated with the at least one terminal when a read-out address of the scan memory coincides with a data region designated by the data area information; and transmitting the scan data to the at least one terminal.

7. The data switching method according to claim 1, wherein said method further comprises the steps of:

sorting data input from the at least one terminal into scan data and message data;

storing the scan data in a scan memory;

storing the message data in a message memory; and reading out the scan data from the scan memory and scan-transmitting the read-out scan data to one of a predetermined terminal and the downstream-side data switching node.

8. The data switching method according to claim 7, wherein said method comprises the steps of:

receiving, from said terminal, frame data having a frame header to which a protocol identifier indicating a protocol type is set; and determining the type of the frame data in accordance with the protocol identifier.

9. A data switching method for a data switching apparatus which operates as one of a plurality of data switching nodes connected to each other through a transmission path on an ATM network, and which is connected to at least one terminal, said data switching method comprising the steps of:

sorting data, transmitted from an upstream-side data switching node of the plurality of data switching nodes and said at least one terminal, into scan data and message data, multi-casting the scan data to a downstream-side data switching node of the plurality of switching nodes and said at least one terminal; and transmitting the message data to one of said at least one terminal and said downstream-side data switching node.

10. The data switching method according to claim 9, wherein said method comprises the steps of:

providing the scan data to a multi-destination bus;

acquiring a plurality of multi-destination outputs from the multi-destination bus, thereby to multi-cast the scan data to the downstream-side data switching node and said another terminal; and supplying the multi-destination outputs acquired from the multi-destination bus to a plurality of output gates associated with said another terminal, thereby filtering the multi-destination outputs.

11. The data switching method according to claim 9, wherein said method comprises the steps of:

supplying multi-destination inputs associated with a plurality of links to a multi-destination bus;

acquiring, from the multi-destination bus, a plurality of multi-destination outputs corresponding to the multi-destination inputs of said links; and gathering into one link the multi-destination outputs corresponding to the multi-destination inputs of said links.

12. A data switching method for an apparatus which operates as one of a plurality of data switching nodes connected to each other through a transmission path on an ATM network, said data switching method comprising the steps of:

determining whether or not cell data transmitted from an upstream-side data switching node of the plurality of data switching nodes is scan data based on an identifier of a cell header of the cell data; and outputting the scan data to the transmission path such that the scan data is multiplexed with other data at a higher priority than the other data.

13. A data switching apparatus provided on an ATM network and connected to at least one communication node via a link for transmitting cell data, said apparatus comprising:

trunk-system ports including a trunk system input port for receiving cell data from the at least one communication node and a trunk system output port for transmitting cell data to the at least one communication node;

means for sorting the cell data received from the at least one communication node into scan data and message data;

an ATM switch for passing the message data to the trunk system output port associated with a content of the cell header of a message data;

scan data switching means for receiving the scan data into the data switching apparatus at an input port and for outputting the received scan data to an output port linked to the input port;

branch-system port means functioning as a branch system input port for receiving data from at least one terminal and a branch system input port for transmitting data to said at least one terminal independent of the trunk-system ports; and means for sending the data received from the at least one terminal at the branch-system input port to the branch-system output port and the trunk-system output port.

14. The data switching apparatus according to claim 13, wherein said scan data switching means comprises:

duplicating means for duplicating said scan data to obtain scan data to be received into the data switching apparatus and scan data to be output to the trunk-system output port;

cell removal means for removing unnecessary scan data before the scan data sorted from the cell data is supplied to the duplicating means;

cell framer means for forming cell data from data which originates from the data switching apparatus and is scan-transmitted on the ATM network;

merge means for merging, without interference, the scan data generated by the cell framer means and the scan data output from the duplicating means to the trunk-system output port; and means for determining the trunk-system output port to which the scan data output from the duplicating means is to be supplied.

15. The data switching apparatus according to claim 14, wherein said cell framer means sets an identifier of the data switching apparatus in a cell header of a cell data, and said cell removal means removes the cell data having the cell header in which the identifier of the data switching apparatus is set.

16. The data switching apparatus according to claim 14, wherein said cell removal means comprises:

means for adding a value to a counter field of the cell header of the cell data;

a register for holding a maximum value relating to a value of the counter field; and a gate for passing the cell data having the added value less than the maximum value.

17. The data switching apparatus according to claim 13, wherein said scan data switch means comprises:

means for duplicating said scan data to obtain scan data to be taken in the data switching apparatus and scan data to be output to the trunk-system output port;

cell filtering means for taking into the data switching apparatus only necessary scan data of the scan data output from the duplicating means;

cell framer means for forming cell data from data which originates from the data switching apparatus and is scan-transmitted on the ATM network;

merge means for merging, without interference, the scan data generated by the cell framer means and the scan data output from the duplicating means to the output port of the trunk system; and means for determining the output port of the trunk system, to which the scan data output from the duplicating means is to be supplied.

18. The data switching apparatus according to claim 17, wherein the at least one communication node comprises plural communication nodes divided into plural blocks of nodes, and wherein said cell framer means sets a block identifier of a header of a cell data indicating one of the plural blocks of nodes from which said cell data originated, and said cell filtering means comprises:

a buffer for storing the scan data supplied from the duplicating means;

a take-in gate for receiving the scan data from the buffer;

a register storing a block identifier of blocks to be taken in the data switching apparatus; and gate control means for opening the take-in gate when there is a common portion between the block identifier stored in the register and the block identifier set in the header of the scan data stored in the buffer.

19. The data switching apparatus according to claim 13, further comprising:

a scan memory for storing in a predetermined data area the scan data taken in the data switching apparatus from the scan data switch means;

gate means, having a plurality of gates provided for the respective terminals, for opening the gate associated with the terminal to which the scan data read out from the scan memory is to be transmitted;

a terminal control table on which said terminal writes address information of a data area of the scan memory, in which the scan data required by the terminal is stored, and transmission cycle information; and means for controlling the scan memory on the basis of the address information and the transmission cycle information, and opening the gate associated with the terminal, thereby delivering the scan data read out from the scan memory to the terminal.

20. The data switching apparatus according to claim 13, wherein said terminal transmits to the cell data switching apparatus frame data in which a protocol identifier indicating the protocol type of data is set, and said data switching means of the branch system comprises:
a plurality of memories prepared for respective data types;
means for determining the type of frame data on the basis of the protocol identifier of the frame data received by the branch-system port means; and
means for storing data in said memories in accordance with the determined data types.

21. The data switching apparatus according to claim 13, wherein said branch-system port means includes an ethernet switch, and an ethernet frame received by said branch-system port means is switched by said ethernet switch.

22. A data switching apparatus provided on an ATM network, said apparatus comprising:

a plurality of input ports for receiving cell data from communication nodes and terminals connected to the data switching apparatus through links on the ATM network;

a plurality of output ports for transmitting cell data from communication nodes and terminals connected to the data switching apparatus through the links on the ATM network;

determination means, provided for said associated input ports, for determining the type of the cell data;

an ATM switch for switching message data input from the determination means to the output ports; and multi-destination communication means for copying scan data input from the determination means and multi-destination transmitting the copied data to the output ports.

23. The data switching apparatus according to claim 22, wherein said multi-destination communication means comprises:

a multi-destination communication bus for outputting the scan data;

registers, provided for respective output ports connected to the at least one terminal, for registering take-in block data indicating cell data to be taken in associated terminals of the at least one terminal;

cell take-in gates provided for the respective output ports connected to the at least one terminals; and gate control means, provided for the respective output ports connected to the terminals, for extracting the block identifier from a cell header of the cell data output from said bus, comparing the block identifier with the take-in block data stored in the register of the associated output port, and opening/closing one of the cell take-in gates of the associated output port based on a comparison result.

24. The data switching apparatus according to claim 22, wherein said multi-destination communication means comprises;

a multi-destination communication bus for outputting the scan data;

a plurality of gates associated with a plurality of multi-destination outputs from the multi-destination communication bus;

a plurality of FIFO memories provided in a following stage of the gates;

an AND gate for receiving scan data from the FIFO memories;

a counter for counting the number of cells stored in each FIFO memory; and gate control means for preferentially opening the gate associated with the FIFO memory having a low cell count value on the basis of the count value of the counter.

* * * * *